(12) United States Patent
Dunn et al.

(10) Patent No.: US 11,269,598 B2
(45) Date of Patent: *Mar. 8, 2022

(54) INDUSTRIAL AUTOMATION DOMAIN-SPECIFIC LANGUAGE PROGRAMMING PARADIGM

(71) Applicant: Rockwell Automation Technologies, Inc., Mayfield Heights, OH (US)

(72) Inventors: Ryan Dunn, Strongsville, OH (US); Karl Staas, Willoughby, OH (US); Andrew Stump, Mentor, OH (US); Anthony Carrara, Strongsville, OH (US); Eashwer Srinivasan, Fremont, OH (US); Christopher Como, Chagrin Falls, OH (US); Sharon Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,185

(22) Filed: Jan. 25, 2021

(65) Prior Publication Data

US 2021/0141614 A1   May 13, 2021

Related U.S. Application Data

(63) Continuation of application No. 16/580,672, filed on Sep. 24, 2019, now Pat. No. 10,942,710.

(51) Int. Cl.
*G06F 8/33* (2018.01)
*G05B 19/418* (2006.01)
*G06F 8/30* (2018.01)

(52) U.S. Cl.
CPC ......... *G06F 8/33* (2013.01); *G05B 19/41845* (2013.01); *G06F 8/316* (2013.01)

(58) Field of Classification Search
USPC ....................................................... 717/106
See application file for complete search history.

(56) References Cited

U.S. PATENT DOCUMENTS

| 5,526,522 A | 11/1996 | Takeuchi |
|---|---|---|
| 6,516,451 B1 | 2/2003 | Patin |

(Continued)

FOREIGN PATENT DOCUMENTS

| CN | 105159656 A | 12/2015 |
|---|---|---|
| CN | 107463147 A | 12/2017 |

(Continued)

OTHER PUBLICATIONS

The extended European search report received for European Application No. 20/166,772.2-1202, dated Apr. 23, 2021, 15 pages.

(Continued)

*Primary Examiner* — Wei Y Zhen
*Assistant Examiner* — Clint Thatcher
(74) *Attorney, Agent, or Firm* — Amin, Turocy & Watson, LLP

(57) ABSTRACT

An industrial IDE supports development of control programming using an industrial domain-specific language (DSL) that allows control programming to be written using a scripted programming language having features catered to the industrial domain. The industrial DSL can simplify and streamline development of industrial control code relative to using conventional graphics-based control programming formats such as ladder logic, since a script-based industrial DSL can be used to write programming code using fewer mouse clicks relative to traditional control programming environments. Editing tools inherent to the industrial DSL can provide dynamic programming feedback that guides the developer through the process of developing control code. The industrial IDE can also provide tools that extend the (Continued)

platform to users who wish to customize the industrial DSL to suit their preferred programming approaches.

20 Claims, 17 Drawing Sheets

(56) References Cited

U.S. PATENT DOCUMENTS

| | | | |
|---|---|---|---|
| 6,993,745 | B1 | 1/2006 | Ballantyne et al. |
| 7,313,609 | B1 | 12/2007 | Wischinski |
| 8,667,456 | B1 | 3/2014 | Czymontek |
| 8,812,684 | B1 * | 8/2014 | Hood .................... H04L 51/24 709/227 |
| 9,223,567 | B2 | 12/2015 | DeLuca et al. |
| 10,372,107 | B2 | 8/2019 | Majewski et al. |
| 10,503,632 | B1 | 12/2019 | Sivanantham et al. |
| 10,559,043 | B1 | 2/2020 | Schlintl |
| 10,606,576 | B1 | 3/2020 | Tung et al. |
| 10,761,810 | B2 | 9/2020 | Ramakrishna et al. |
| 10,832,187 | B2 | 11/2020 | Sharma et al. |
| 10,936,807 | B1 | 3/2021 | Walters et al. |
| 11,048,500 | B2 | 6/2021 | Grant et al. |
| 2002/0191023 | A1 | 12/2002 | Chandhoke et al. |
| 2003/0009250 | A1 | 1/2003 | Resnick et al. |
| 2003/0028364 | A1 | 2/2003 | Chan et al. |
| 2004/0073404 | A1 | 4/2004 | Brooks et al. |
| 2004/0088688 | A1 | 5/2004 | Hejlsberg et al. |
| 2005/0257203 | A1 | 11/2005 | Nattinger |
| 2005/0268288 | A1 | 12/2005 | Nattinger |
| 2006/0041440 | A1 | 2/2006 | Cheng et al. |
| 2006/0224534 | A1 | 10/2006 | Hartman et al. |
| 2007/0016309 | A1 | 1/2007 | Mckelvey et al. |
| 2007/0282766 | A1 | 12/2007 | Hartman et al. |
| 2008/0022259 | A1 | 1/2008 | Macklem et al. |
| 2008/0092131 | A1 | 4/2008 | Mcintyre et al. |
| 2008/0235166 | A1 | 9/2008 | Sayyar-Rodsar et al. |
| 2009/0064103 | A1 | 3/2009 | Shih |
| 2009/0083649 | A1 | 3/2009 | Baier et al. |
| 2009/0089234 | A1 | 4/2009 | Sturrock et al. |
| 2009/0276752 | A1 | 11/2009 | Sharma |
| 2010/0082133 | A1 | 4/2010 | Chouinard et al. |
| 2010/0269094 | A1 | 10/2010 | Levenshteyn et al. |
| 2011/0239198 | A1 | 9/2011 | Sweis |
| 2012/0109590 | A1 | 5/2012 | Trainer et al. |
| 2013/0123946 | A1 | 5/2013 | Govindaraj et al. |
| 2013/0212214 | A1 | 8/2013 | Lawson et al. |
| 2013/0218867 | A1 | 8/2013 | DeLuca et al. |
| 2013/0332212 | A1 | 12/2013 | Cohen |
| 2014/0013313 | A1 | 1/2014 | Eker et al. |
| 2014/0047413 | A1 | 2/2014 | Sheive et al. |
| 2014/0096108 | A1 | 4/2014 | Austin |
| 2014/0229389 | A1 | 8/2014 | Pantaleano et al. |
| 2014/0337277 | A1 | 11/2014 | Asenjo et al. |
| 2014/0359586 | A1 | 12/2014 | Payette et al. |
| 2015/0186119 | A1 | 7/2015 | Chouinard et al. |
| 2016/0274552 | A1 * | 9/2016 | Strohmenger ......... G06Q 10/06 |
| 2016/0291566 | A1 | 10/2016 | Prosak et al. |
| 2016/0330082 | A1 * | 11/2016 | Bliss .................. H04L 41/0873 |
| 2016/0364675 | A1 | 12/2016 | Sharma et al. |
| 2017/0206237 | A1 | 7/2017 | Sokol et al. |
| 2017/0308052 | A1 | 10/2017 | Kajiyama |
| 2017/0329687 | A1 | 11/2017 | Chorley et al. |
| 2017/0336947 | A1 * | 11/2017 | Bliss .................. G06F 3/04842 |
| 2017/0357565 | A1 | 12/2017 | Ledet |
| 2018/0025286 | A1 | 1/2018 | Gorelik et al. |
| 2018/0039905 | A1 | 2/2018 | Anghel et al. |
| 2018/0052451 | A1 | 2/2018 | Billi-Duran et al. |
| 2018/0083982 | A1 | 3/2018 | Asenjo et al. |
| 2018/0130260 | A1 | 5/2018 | Schmirler et al. |
| 2018/0131907 | A1 | 5/2018 | Schmirler et al. |
| 2018/0136910 | A1 | 5/2018 | Noetzelmann et al. |
| 2018/0192075 | A1 | 7/2018 | Chambers et al. |
| 2018/0197347 | A1 | 7/2018 | Tomizuka |
| 2018/0246803 | A1 | 8/2018 | Zhang |
| 2018/0357922 | A1 | 12/2018 | Dutta et al. |
| 2018/0373885 | A1 | 12/2018 | Arad et al. |
| 2019/0012151 | A1 | 1/2019 | Holbrook et al. |
| 2019/0057548 | A1 | 2/2019 | Singh et al. |
| 2019/0079643 | A1 | 3/2019 | Kershaw et al. |
| 2019/0079740 | A1 | 3/2019 | Sharma et al. |
| 2019/0147655 | A1 | 5/2019 | Galera et al. |
| 2019/0188108 | A1 | 6/2019 | Jagannathan |
| 2019/0205113 | A1 | 7/2019 | Karpoff et al. |
| 2019/0220253 | A1 | 7/2019 | Pradhan et al. |
| 2019/0279132 | A1 | 9/2019 | Escriche et al. |
| 2019/0385342 | A1 | 12/2019 | Freeman et al. |
| 2020/0019147 | A1 | 1/2020 | Ludwig et al. |
| 2020/0019493 | A1 | 1/2020 | Ramakrishna et al. |
| 2020/0150638 | A1 | 5/2020 | Mourzine et al. |
| 2020/0175395 | A1 | 6/2020 | Kathiresan et al. |
| 2020/0285462 | A1 | 9/2020 | Sabath et al. |
| 2021/0011712 | A1 | 1/2021 | Grant et al. |
| 2021/0089278 | A1 | 3/2021 | Dunn et al. |
| 2021/0096526 | A1 | 4/2021 | Ericsson et al. |
| 2021/0096704 | A1 | 4/2021 | Ericsson et al. |
| 2021/0294307 | A1 | 9/2021 | Onteddu et al. |

FOREIGN PATENT DOCUMENTS

| | | |
|---|---|---|
| CN | 108829024 A | 11/2018 |
| CN | 208314755 U | 1/2019 |
| CN | 109765836 A | 5/2019 |
| CN | 109840085 A | 6/2019 |
| EP | 1 256 861 A1 | 11/2002 |
| EP | 2177986 A1 | 4/2010 |
| EP | 2 801 939 A1 | 11/2014 |
| EP | 3101565 A1 | 7/2016 |
| EP | 3 070 548 A2 | 9/2016 |
| EP | 3318944 A2 | 5/2018 |
| EP | 3376325 A1 | 9/2018 |
| EP | 3511820 A1 | 7/2019 |
| EP | 3798768 A2 | 3/2021 |
| WO | 2008/115644 A1 | 9/2008 |
| WO | 2014092694 A1 | 6/2014 |
| WO | 2016053337 A1 | 4/2016 |
| WO | 2016195690 A1 | 12/2016 |
| WO | 2019/136754 A1 | 7/2019 |

OTHER PUBLICATIONS

The extended European search report received for European Application No. 20166284.8-1202, dated Feb. 17, 2021, 08 pages.
Communication pursuant to Rule 69 EPC received for European Patent Application Serial No. 20166284.8 dated Apr. 7, 2021, 2 pages.
Communication pursuant to Rule 69 EPC received for European Patent Application Serial No. 20167085.8 dated Apr. 7, 2021, 2 pages.
Communication pursuant to Rule 69 EPC received for European Patent Application Serial No. 20166680.7 dated Apr. 7, 2021, 2 pages.
Communication pursuant to Rule 69 EPC received for European Patent Application Serial No. 20167073.4 dated Apr. 7, 2021, 2 pages.
Communication pursuant to Rule 6 9 EPC received for European Patent Application Serial No. 20166776.3 dated Apr. 7, 2021, 2 pages.
Communication pursuant to Rule 69 EPC received for European Patent Application Serial No. 20166286.3 dated Apr. 7, 2021, 2 pages.
Non final office action received for U.S. Appl. No. 16/584,210 dated Aug. 30, 2021, 60 Pages.
Communication pursuant to Rule 69 EPC received for European Patent Application Serial No. 20166772.2 dated May 31, 2021, 2 pages.
European Search Report for European Application No. 20166286.3-1224, dated Jan. 29, 2021.
Eclipse: "Using JavaScript Syntax Coloring," Mar. 5, 2019. Retrieved from internet Jan. 20, 2021. https://web.archive.org/web/20190305182138/http://www.eclipse.org:80/pdUhelp/html/using_javascript_syntax_coloring.htm.

(56) References Cited

OTHER PUBLICATIONS

European Search Report for European Application No. 20166776. 3-1202, dated Feb. 24, 2021.
European Search Report for European Application No. 20167085. 8-1224, dated Feb. 5, 2021.
European Search Report for European Application No. 20166772. 2-1202, dated Feb. 3, 2021.
European Search Report for European Application No. 20166680. 7-1202, dated Jan. 21, 2021.
Non Final office action received for U.S. Appl. No. 16/584,470 dated Feb. 18, 2021, 46 Pages.
Extended European Search Report received for EP Patent Application Serial No. 20167073.4 dated May 28, 2020, 11 pages.
Iriondo et al., "Automatic Generation of the Supervisor Code for Industrial Switched-Mode Systems", IEEE Transactions on Industrial Informatics, IEEE Service Center, vol. 9, No. 4, Nov. 1, 2013, pp. 1868-1878.
Wikipedia, "Semi-supervised learning", URL: https://en.wikipedia.org/w/index.php?title=Semi-supervisedlearning&oldid=900515496, Jun. 6, 2019, pp. 1-7.
Non final office action received for U.S. Appl. No. 16/580,672 dated Oct. 1, 2020, 106 Pages.
Grundy et al.; "Generating Domain-Specific Visual Language Tools from Abstract Visual Specifications"; IEEE Transactions on Software Engineering, vol. 39, No. 4 (pp. 487-515); Apr. 2013 (Year: 2013).
Salihbegovic et al.; "Design of a Domain Specific Language and IDE for Internet of Things Applications"; 38th International Convention on Information and Communication Technology, Electronics and Microelectronics (MIPRO) (pp. 996-1001); 2015 (Year:2015).
Schmitt et al.; "An Evaluation of Domain-Specific Language Technologies for Code Generation"; 14th International Conference on Computational Science and Its Applications (pp. 18-26); 2014 (Year: 2014).
Dwarakanath et al.; "Accelerating Test Automation Through a Domain Specific Language"; IEEE International Conference on Software Testing, Verification and Validation (ICST) (pp. 460-467); 2017 (Year: 2017).
Preuer, Stefan; "A Domain-Specific Language for Industrial Automation"; Software Engineering 20079—Beitrage zu den Workshops—Fachtagung des GI-Fachbereichs Softwaretechnik. Gesellschaft fi.ir Informatik e. V., 2007 (Year: 2007).
Vyatkin, Valeriy; "Software Engineering in Industrial Automation: State-of-the-Art Review"; IEEE Transactions on Industrial Informatics 9.3: (pp. 1234-1249); 2013 (Year: 2013).
NetBeans IDE; Netbeans.org website [full url in ref.]; Oct. 1, 2012 (Year: 2012).
Notice of allowance received for U.S. Appl. No. 16/580,672 dated Oct. 30, 2020, 23 Pages.
Non Final office action received for U.S. Appl. No. 16/580,581 dated Oct. 20, 2020, 51 Pages.
Non Final office action received for U.S. Appl. No. 16/584,298 dated Oct. 20, 2020, 63 Pages.
Non Final office action received for U.S. Appl. No. 16/584,368 dated Nov. 18, 2020, 44 Pages.
Non-Final office action received for U.S. Appl. No. 16/838,330 dated Aug. 5, 2021, 56 Pages.
Communication pursuant to Article 94(3) EPC received for European Patent Application Serial No. 20167073.4 dated Oct. 27, 2021, 9 pages.
Communication pursuant to Rule 69 EPC received for European Patent Application Serial No. 20166680.7 dated Nov. 30, 2021, 3 pages.
Extended European Search Report received for European Patent Application Serial No. 21165314.2 dated Aug. 18, 2021, 13 pages.
Extended European Search Report received for European Patent Application Serial No. 21165314.2 dated Oct. 11, 2021, 2 pages.
Notice of Allowance received for U.S. Appl. No. 16/838,330 dated Dec. 20, 2021, 78 Pages.
Ewenike, S., et al.. Cloud Based Collaborative Software Development: A Review, Gap Analysis and Future Directions, 2017 IEEE/ACS 14th International Conference on Computer Systems and Applications, pp. 901-909, 2017, [retrieved on Nov. 26, 2021], Retrieved from the Internet: <U RL:http://ieeexplore.IEEE.org/>.
Figueiredo, M., et al., Wolf: Supporting Impact Analysis Activities in Distributed Software Development, 2012 5th International Workshop on Co-operative and Human Aspects of Software Engineering (CHASE), pp. 40-46, Jun. 2012, [retrieved on Nov. 26, 2021], Retrieved from the Internet: <U RL:http://ieeexplore.IEEE.org/>.

* cited by examiner

INDUSTRIAL ASSET

INDUSTRIAL AUTOMATION DOMAIN-SPECIFIC LANGUAGE PROGRAMMING PARADIGM

CROSS-REFERENCE TO RELATED APPLICATIONS

This application is a continuation of, and claims priority to, U.S. patent application Ser. No. 16/580,672, filed on Sep. 24, 2019, and entitled "INDUSTRIAL AUTOMATION DOMAIN-SPECIFIC LANGUAGE PROGRAMMING PARADIGM," the entirety of which is incorporated herein by reference.

BACKGROUND

The subject matter disclosed herein relates generally to industrial automation systems, and, for example, to industrial programming development platforms

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial control programming is provided, comprising a user interface component configured to receive industrial control programming formatted as an industrial domain-specific language (DSL) and to render programming feedback in response to receipt of the industrial control programming; and a DSL editor configured to parse the industrial control programming, formatted as the industrial DSL, to yield a hierarchical model of the industrial control programming and to compile the hierarchical model to yield industrial control code that is executable on an industrial control device.

Also, one or more embodiments provide a method for programming industrial systems, comprising receiving, by a system comprising a processor, industrial control programming scripted as an industrial domain-specific language (DSL); rendering, by the system, programming feedback in response to receipt of the industrial control programming; parsing, by the system, the industrial control programming formatted as the industrial DSL to yield a hierarchical model of the industrial control programming; and compiling, by the system, the hierarchical model to yield industrial control code that is executable on an industrial control device.

Also, according to one or more embodiments, a non-transitory computer-readable medium is provided having stored thereon instructions that, in response to execution, cause a system to perform operations, the operations comprising receiving industrial control programming scripted as an industrial domain-specific language (DSL); rendering programming feedback in response to receipt of the industrial control programming; parsing the industrial control programming formatted as the industrial DSL to yield a hierarchical model of the industrial control programming; and compiling the hierarchical model into industrial control code that is executable on an industrial control device.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
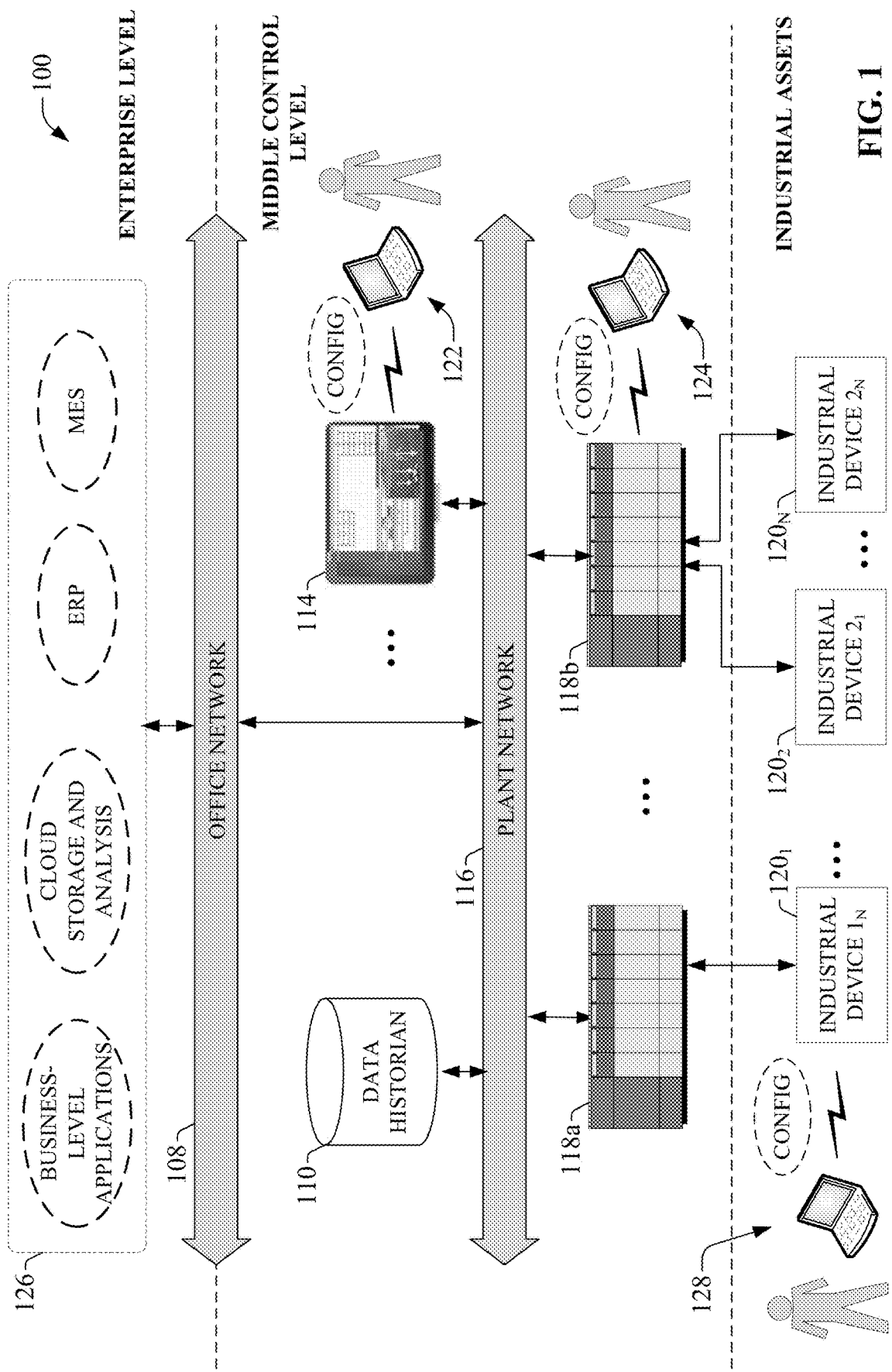
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledge-bases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

Industrial development platforms are also limited in terms of the development interfaces offered to the user to facilitate programming and configuration. These interfaces typically offer a fixed user experience that requires the user to develop control code, visualizations, or other control system aspects using a vendor-specific or industry-specific language or interface.

To address at least some of these or other issues, one or more embodiments described herein provide an integrated development environment (IDE) for programming and configuration of multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE implements features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

Also, one or more embodiments of the industrial IDE can support development of control programming using an industrial domain-specific language (DSL) that allows control programming to be written using a scripted programming language having features catered to the industrial domain. For example, the industrial DSL can support the creation and inclusion of automation objects within the control program. Automation object types can represent various types of industrial assets or entities, including but not limited to industrial processes, machines, industrial devices (e.g., controllers, motor drives, telemetry devices, etc.), industrial robots, actuators, HMI screens, control routines, controller tags, or other such entities specific to the industrial domain. These automation objects can be organized according to a namespace that defines parent-child relationships between the objects; e.g., in terms of the hierarchical relationships between their associated industrial assets or entities.

The industrial DSL can simplify and streamline development of industrial control code relative to using conventional graphics-based control programming formats such as ladder logic, since a script-based industrial DSL can be used to write programming code using fewer mouse clicks relative to traditional control programming environments. Editing tools inherent to the industrial DSL can also provide dynamic programming feedback that guides the developer through the process of developing control code. This feedback can be generated based on industry-specific or vertical-specific standards encoded in the industrial IDE as programming guardrails. These guardrails can provide programming feedback that facilitate compliance with industry control or programming standards, which may be specific to the particular industrial vertical for which the program is being developed (e.g. automotive, food and drug, textiles, oil and gas, etc.). The guardrails can also be customized to provide feedback that keeps programmers within compliance of in-house programming standards.

The industrial IDE can also provide tools that extend the platform to users who wish to customize the industrial DSL to suit their preferred programming approaches. This can include allowing users to define their own automation objects, programming syntax, syntax or error highlighting, programming guardrails, or other such features of the industrial DSL.

Figure 2:
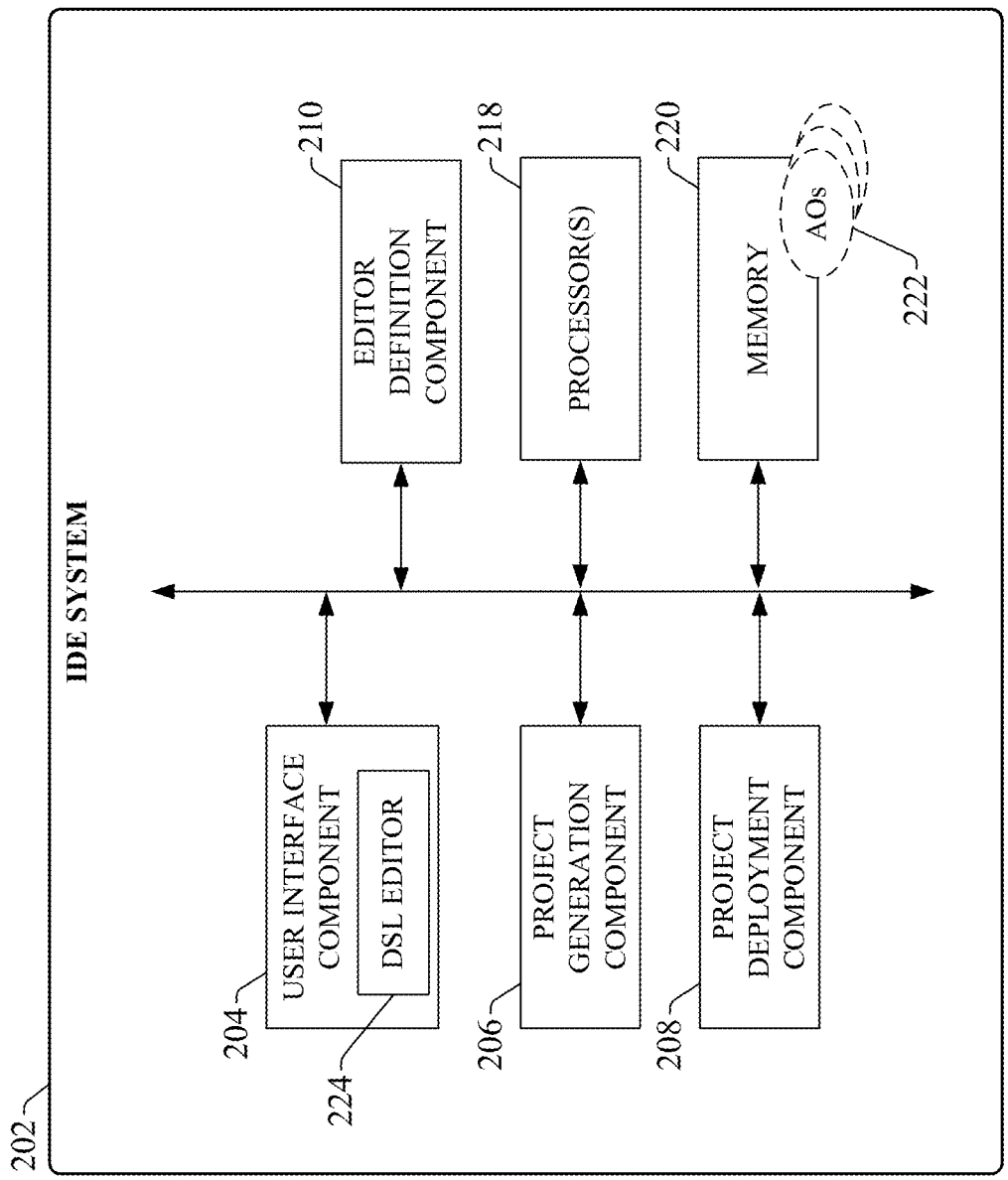
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including a DSL editor 224, a project generation component 206, a project deployment component 208, an editor definition component 210, one or more processors 218, and memory 220. In various embodiments, one or more of the user interface component 204, project generation component 206, project deployment component 208, editor definition component 210, the one or more processors 218, and memory 220 can be electrically and/or communicatively coupled to one another to perform one or more of the functions of the IDE system 202. In some embodiments, components 204, 206, 208, and 210 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, or other such input. Output data rendered by various embodiments of user interface component 204 can include program code, programming feedback (e.g., error and highlighting, coding suggestions, etc.), programming and visualization development screens, etc.

Project generation component 206 can be configured to create a system project comprising one or more project files based on design input received via the user interface component 204, as well as industrial knowledge, predefined code modules, and automation objects 222 maintained by the IDE system 202. Project deployment component 208 can be configured to commission the system project created by the project generation component to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Editor definition component 210 can be configured to receive DSL definition data that defines or modifies programming aspects of the industrial DSL, and to configure the DSL editor in accordance with the DSL definition data. DSL programming features that can be configured via the editor definition component 210 can include, but are not limited to, the DSL syntax, types of programming feedback and conditions under which the feedback is provided (e.g., error highlighting, syntax highlighting, coding recommendations, etc.), available automation objects, namespace definitions, or other such features.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
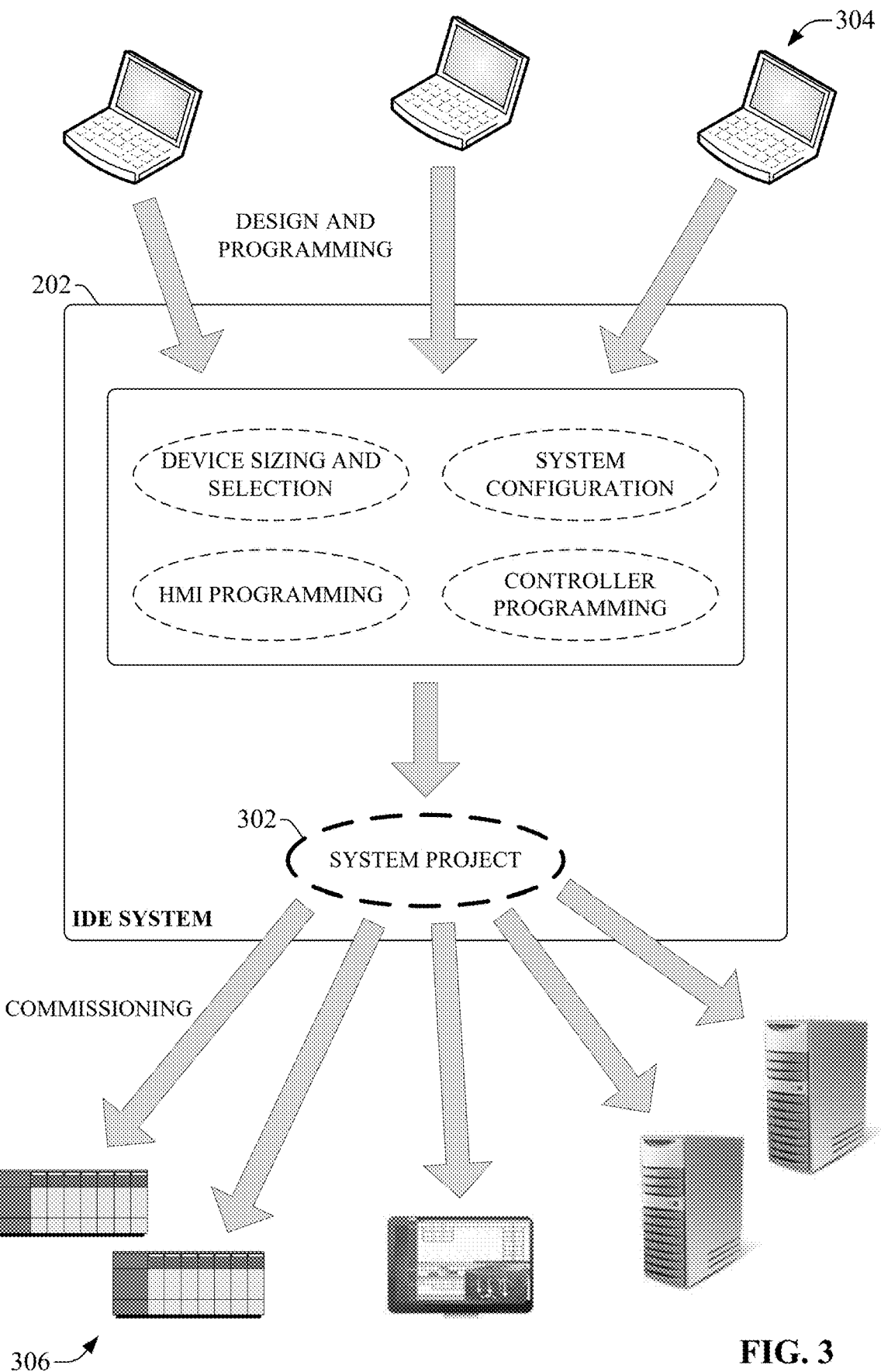
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
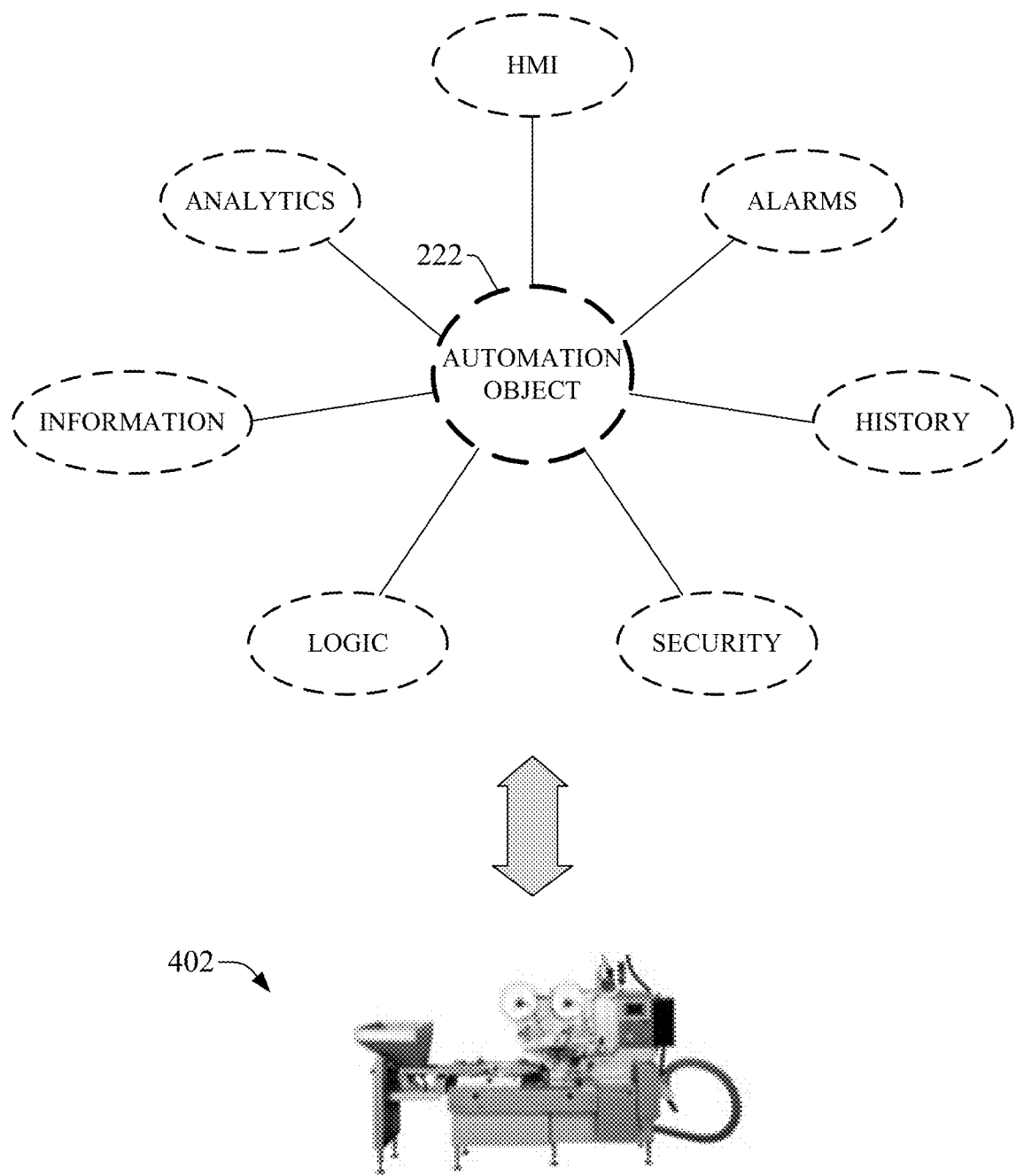
FIG. 4 is a diagram illustrating several example automation object properties that can be leveraged by the IDE system in connection with building, deploying, and executing a system project.

To support enhanced development capabilities, some embodiments of IDE system 202 can be built on an object-based data model rather than a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols, validation reports, simulations, schematics, security protocols, and other such properties associated with the industrial asset 402 represented by the object 222. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
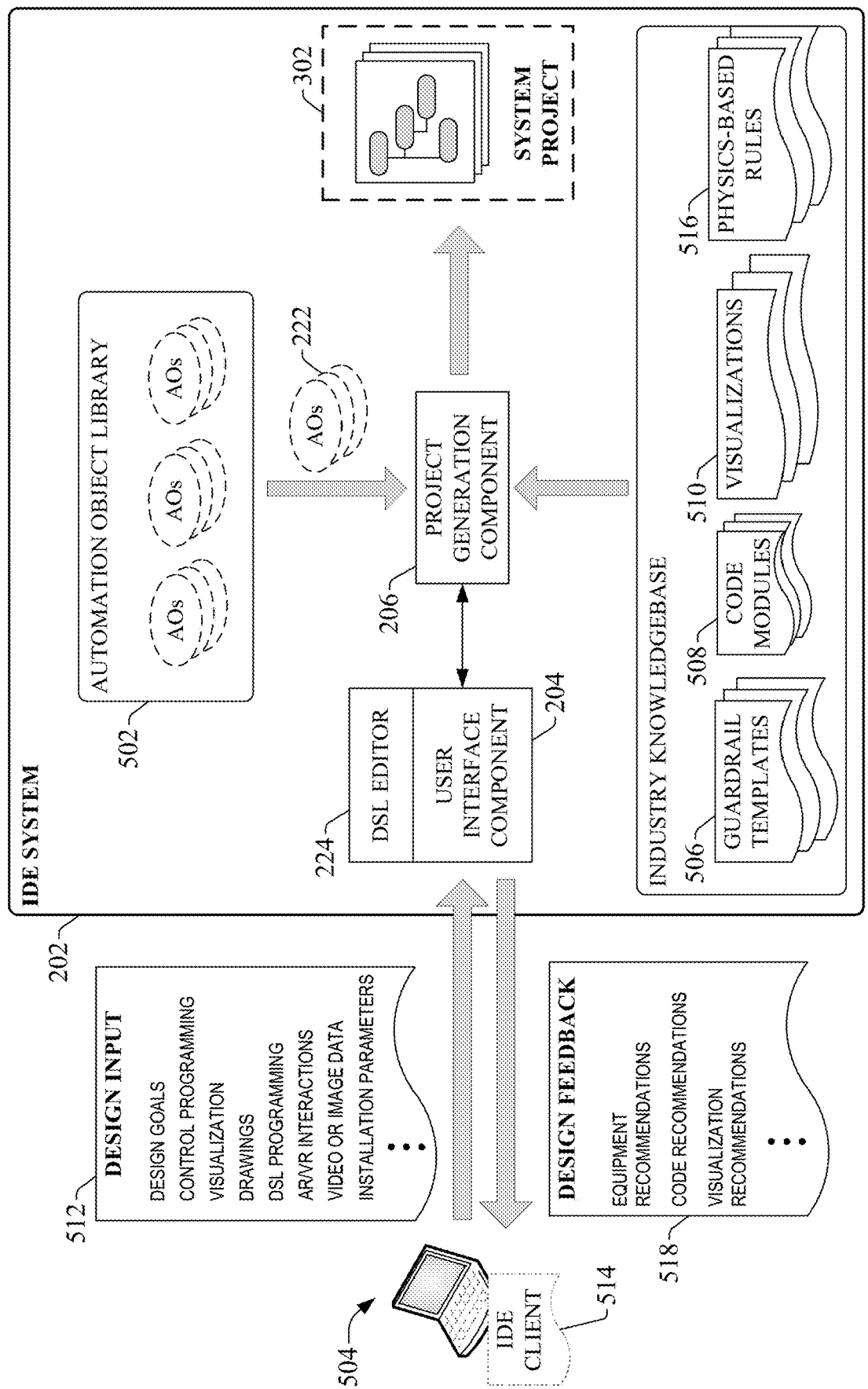
FIG. 5 is a diagram illustrating example data flows associated with creation of a system project for an automation system being designed using an industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the designer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements between the drawings) and intelligently associate these elements with appropriate automation objects 222, code modules 508, and visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

In another example, markings applied to an engineering drawing by a user can be understood by some embodiments of the project generation component 206 to convey a specific design intention or parameter. For example, a marking in red pen can be understood to indicate a safety zone, two circles connected by a dashed line can be interpreted as a gearing relationship, and a bold line may indicate a camming relationship. In this way, a designer can sketch out design goals on an existing drawing in a manner that can be understood and leveraged by the IDE system 202 to generate code and visualizations. In another example, the project generation component 206 can learn permissives and interlocks (e.g., valves and their associated states) that serve as necessary preconditions for starting a machine based on analysis of the user's CAD drawings. Project generation component 206 can generate any suitable code (ladder, function blocks, etc.), device configurations, and visualizations based on analysis of these drawings and markings for incorporation into system project 302. In some embodiments, user interface component 204 can include design tools for developing engineering drawings within the IDE platform itself, and the project generation component 206 can generate this code as a background process as the user is creating the drawings for a new project. In some embodiments, project generation component 206 can also translate state machine drawings to a corresponding programming sequence, yielding at least skeletal code that can be enhanced by the developer with additional programming details as needed.

Also, or in addition, some embodiments of IDE system 202 can support goal-based automated programming. For example, the user interface component 204 can allow the user to specify production goals for a system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed), associated device configurations (e.g., tuning parameters, network settings, drive parameters, etc.), control coding, or HMI screens suitable for visualizing the automation system being designed.

Some embodiments of project generation component 206 can also monitor customer-specific design approaches for commonly programmed functions (e.g., pumping applications, batch processes, etc.) and generate recommendations for design modules (e.g., code modules 508, visualizations 510, etc.) that the user may wish to incorporate into a current design project based on an inference of the designer's goals and learned approaches to achieving the goal. For example, given a set of industrial equipment being programmed, user interface component 204 can render recommended development steps or code modules 508 the designer may wish to use based on how the designer typically configures and programs this equipment.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback during project development designed to keep the developer's system project 302 within compliance of internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, the types and format of error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback such as dynamic intelligent autocorrection, type-aheads, or coding suggestions are rendered based on industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and user interface component 204 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions, project generation component 206 can invoke selected code modules 508 stored in a code module database (e.g., on memory 220). These code modules 508 comprise standardized coding segments for common industrial tasks or applications (e.g., palletizing, flow control, web tension control, pick-and-place applications, etc.). In some embodiments, code modules 508 can be categorized according to one or more of an industrial vertical (e.g., automotive, food and drug, oil and gas, textiles, marine, pharmaceutical, etc.), an industrial application, or a type of machine or device to which the code module 508 is applicable. In some embodiments, project generation component 206 can infer a programmer's current programming task or design goal based on programmatic input being provided by a the programmer, and determine, based on this task or goal, whether one of the pre-defined code modules 508 may be appropriately added to the control program being developed to achieve the inferred task or goal. For example, project generation component 206 may infer that the programmer is currently developing control code for transferring material from a first tank to another tank, and in response, recommend inclusion of a predefined code module 508 comprising standardized code for controlling the valves, pumps, or other assets necessary to achieve the material transfer.

Customized guardrail templates 506 can also be defined to capture the nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a given flow control application, wiring gauges suitable for an expected electrical load, minimum distances between signal wiring and electromagnetic field (EMF) sources to ensure negligible electrical interference, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

In some embodiments, project generation component 206 can also analyze photographic or video data of an existing machine to determine inline mechanical properties such as gearing or camming and factor this information into one or more guardrail templates 506 or design recommendations.

In some embodiments, user interface component 204 is associated with a domain-specific language (DSL) editor 224 that can allow users to program their own development interfaces for interacting with the IDE system 202 and populating the system project 302, as will be discussed in more detail below.

Figure 6:
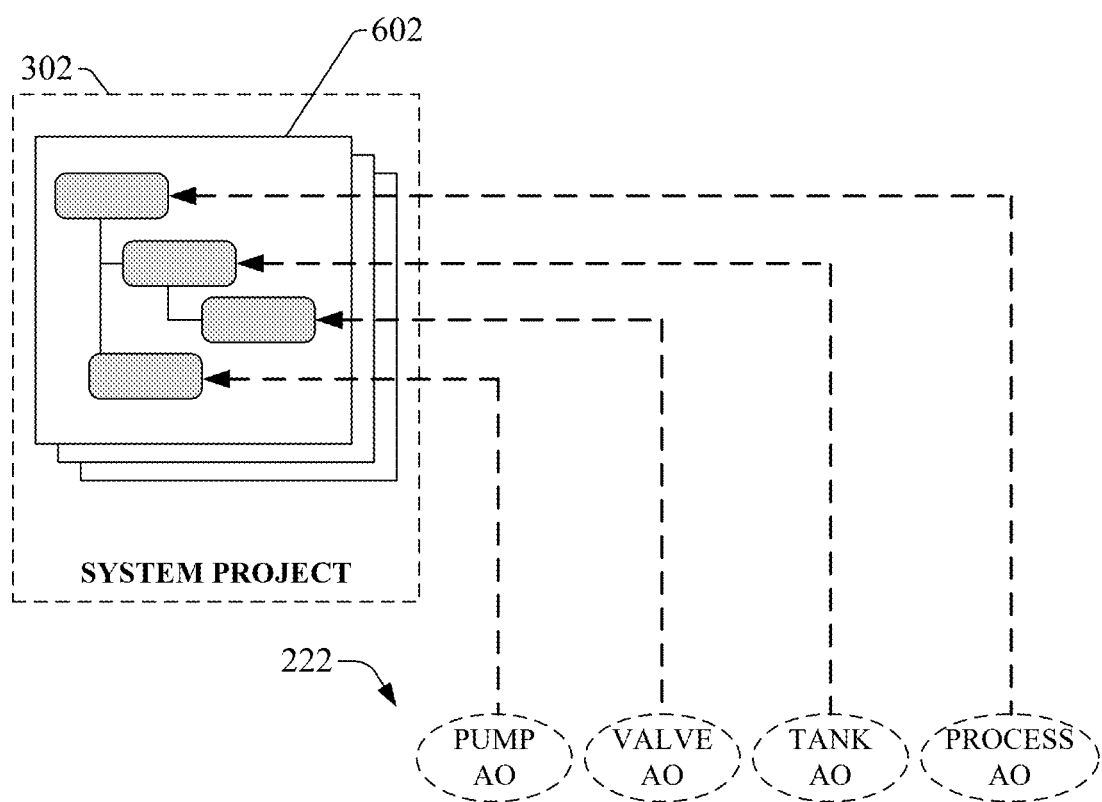
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. Other properties can be modified or added by the developer as needed (via design input 512) to customize the object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
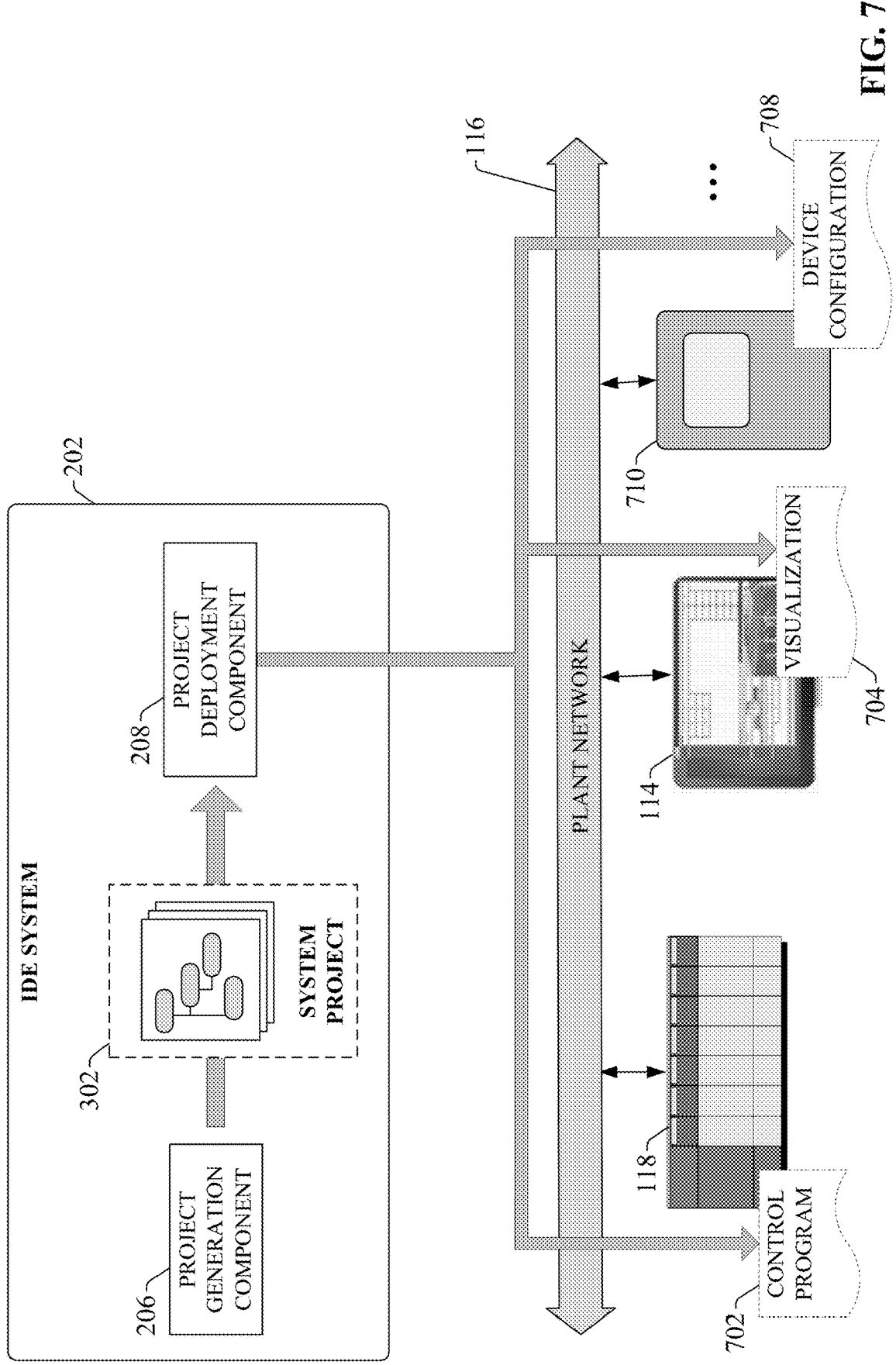
FIG. 7 is a diagram illustrating commissioning of a system project.

Once development on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration. In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., varying pump types at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
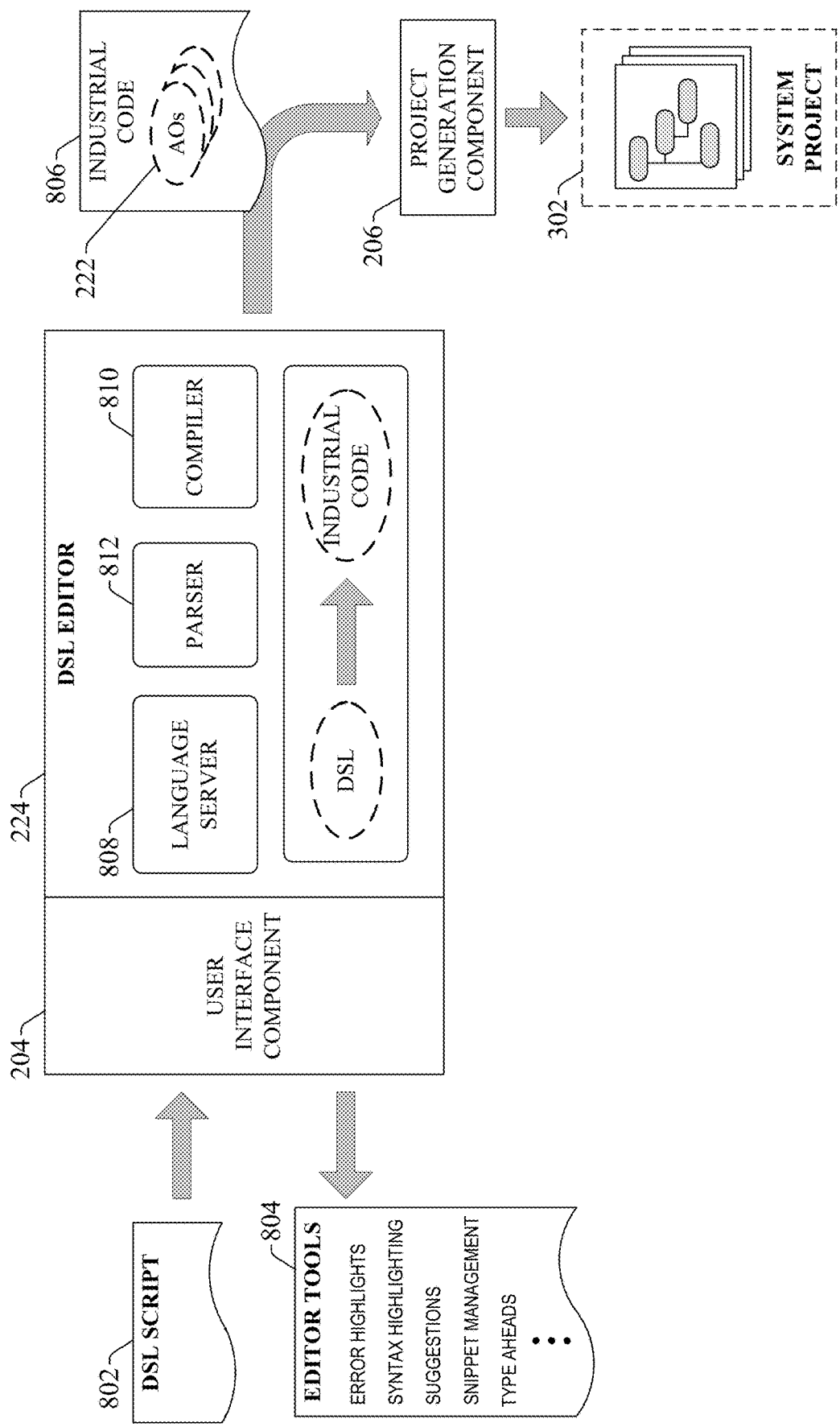
FIG. 8 is a diagram illustrating control programming using an industrial DSL and compilation of the DSL programming to yield executable industrial code.

Returning briefly to FIG. 5, as an alternative to entering control programming in a graphical industry-standard format such as ladder logic (as a portion of design input 512), some embodiments of user interface component 204 can support entry of control programming as a scripted, text-based syntax. In some such embodiments, the scripted language may be a domain-specific language (DSL) customized for industrial control programming FIG. 8 is a diagram illustrating control programming using an industrial DSL and compilation of the DSL programming to yield executable industrial code 806. According to these embodiments, user interface component 204 is associated with a DSL editor 224 that renders a DSL programming interface for entry of industrial DSL script 802. The DSL editor 224 also supports associated editor tools 804 that provide dynamic assistance during programming. Writing control code using a text-based DSL syntax—allowing programming objects to be described through text—can be preferable to programming with ladder logic or other graphical programming platforms typically used to program automation systems, since experienced programmers can generate code more quickly using text-based programming syntax and associated editor tools 804 that require fewer mouse clicks. Editor tools 804 supported by the DSL editor 224 can include, but are not limited to, error highlighting, syntax highlighting, code snippet management, type-ahead or auto-complete functionality, intelligent programming suggestions, and other such tools. Some or all of these programming services can be provided by a language server 808 associated with the DSL editor 224.

Figure 9A:
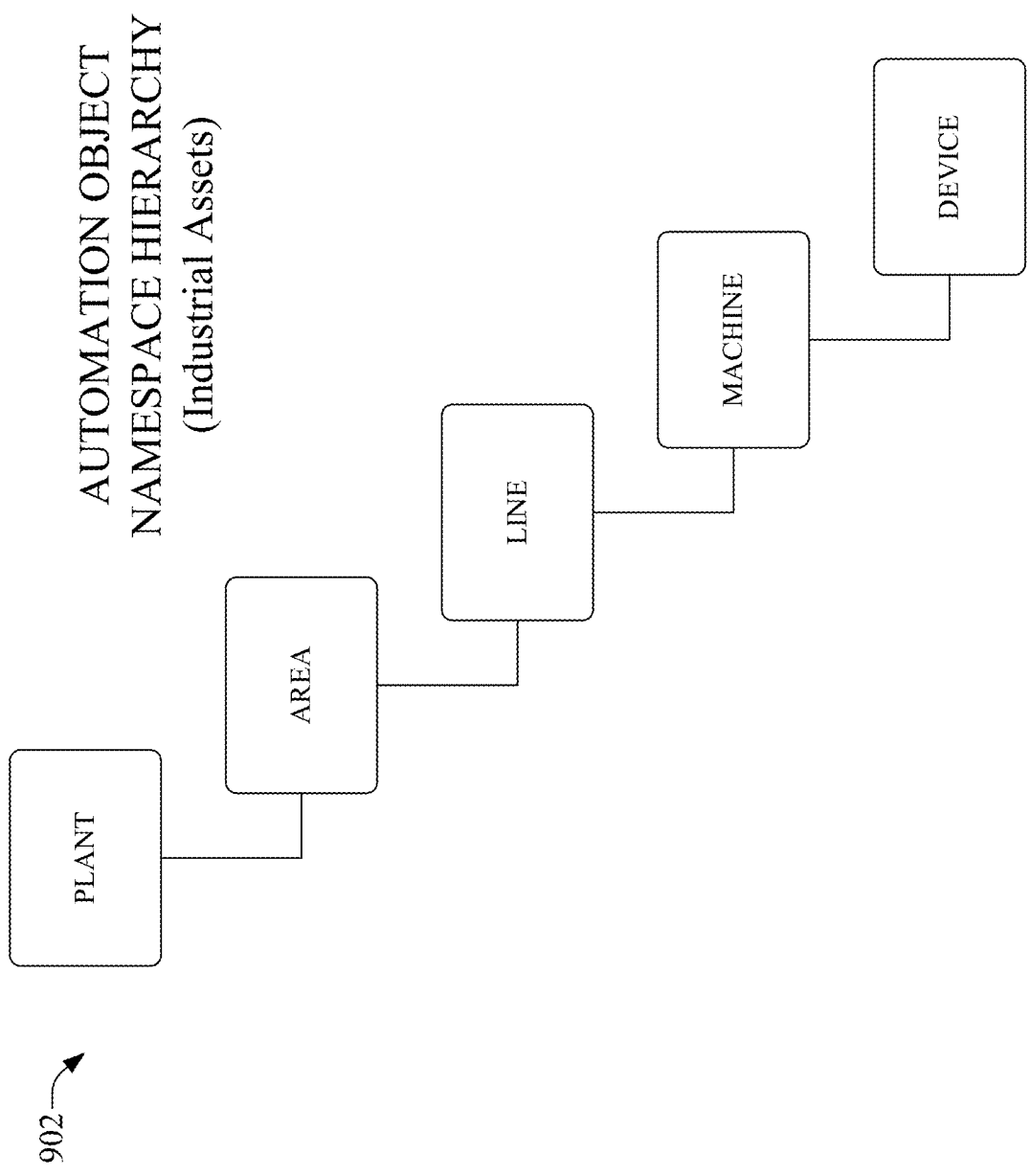
FIG. 9a is an example automation object namespace hierarchy that can be supported by some embodiments of the industrial DSL.

In some embodiments, the industrial DSL can reference a logical model defining a hierarchical organization of automation objects, which serves as a namespace for the automation objects and the elements contained within the automation objects. FIG. 9a is an example automation object namespace hierarchy 902 that can be supported by some embodiments of the industrial DSL. This example hierarchical structure of automation objects may comprise a plant level, an area level, a line level, a machine level, and a device level. Under this namespace, an automation object representing a particular tank of a mixing line located within a batching area of a plant can be referenced using the following example name scope: myFactory.batchingArea .mixingLine.tank101 (assuming types formatted using the camel case naming convention). In general, each automation object 222 within the hierarchy defines a unique name scope, which is the union of the object's name plus the names of its parent automation objects.

In addition to automation objects 222 representing devices (e.g., industrial controllers, drives, HMI terminals, optical safety devices, etc.), machines, production areas, or other industrial assets, IDE system 202 can also support automation objects 222 representing elements of a control program, including but not limited to the program itself as well as add-on instructions, data tags, ladder logic routines or rungs, or other such programmatic elements within the program. For example, a control program that facilitates control of a tank (tank101) within a specified production area (Area1) may be referenced within the DSL namespace as Area1.tank101.tankProgram.

Similarly, automation objects 222 can be defined that represent visualizations elements, such as HMI screens, pop-up windows, augmented reality overlays, etc. Such visualization automation objects 222 can be bound to a parent automaton object 222 representing the industrial asset with which the visualization is to be associated. For example, a screen automation object 222 representing an HMI screen for visualizing a tank can be defined within the DSL namespace as a child object of the tank's (parent) automation object. The HMI screen automation object 222 can be written to define the dimensions, colors (e.g., background color, font color, etc.), text, or other such properties of the screen.

Figure 9B:
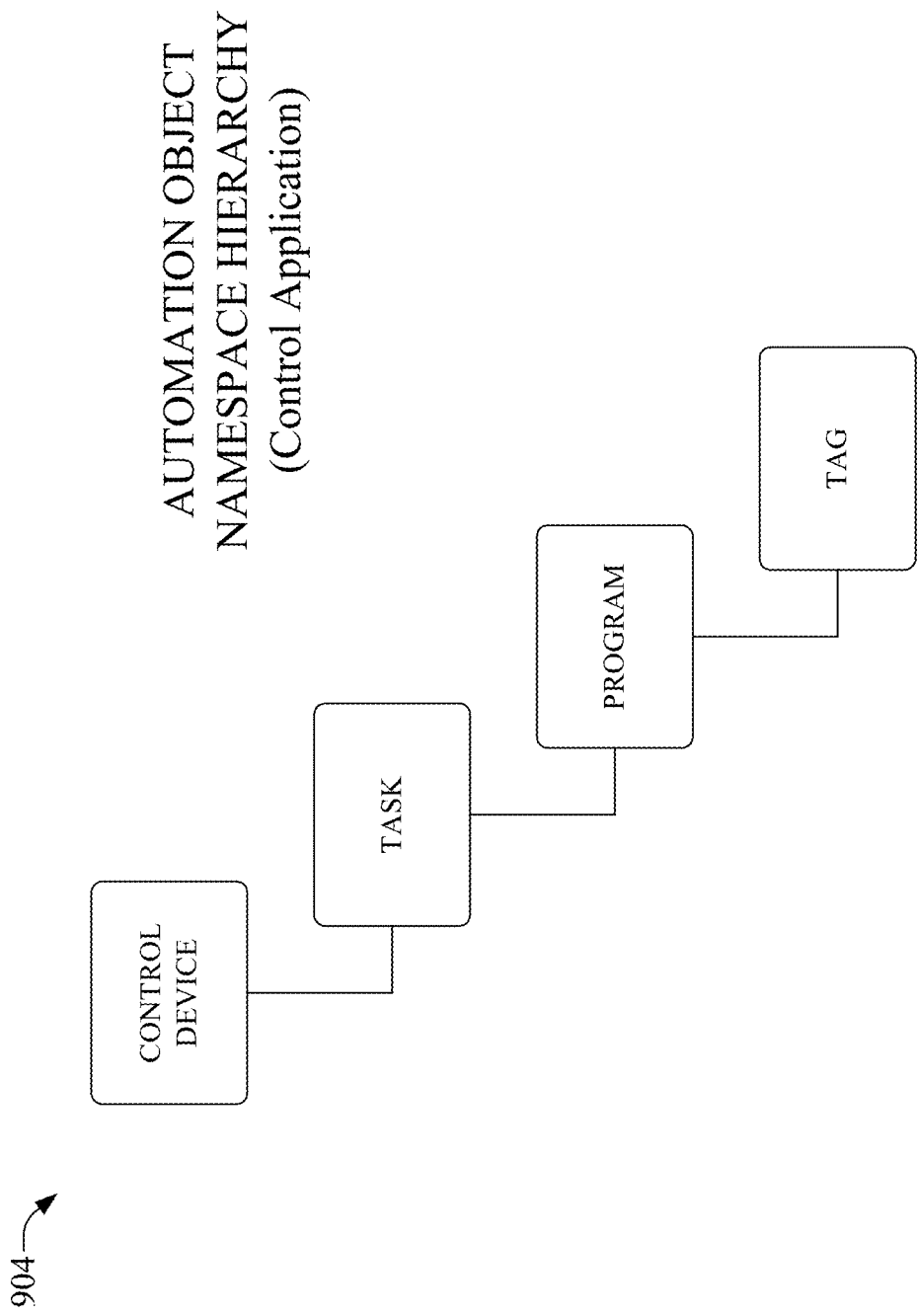
FIG. 9b is another example automation object namespace hierarchy for control application elements, which can be supported by some embodiments of the namespace DSL.

Any type of application that can be deployed to an industrial device—e.g., control programs, HMI applications, motor drive applications, batch control applications, etc.—can be associated with its own automation object 222 defined within the DSL namespace and bound to its appropriate parent automation object (representing the target device or asset on which the application will run). In some embodiments, elements within an application—e.g., tags, rungs, routines, tasks, HMI graphical elements, etc.—can be referenced using a different namespace than that used for physical industrial assets, or using a nested namespace within the greater asset namespace. For example, FIG. 9b is another example automation object namespace hierarchy 904 for control application elements, which can be supported by some embodiments of the namespace DSL. This example control application namespace comprises a control device level, a task level, a program level, and a tag level. Under this namespace, an automation object representing a tag (e.g., tagA) defined in a control program can be referenced using the following example name scope: myController1.mainTask.mainProgram.tagA. The application namespace 04 can be nested within the asset namespace 902 in some embodiments, such that automation objects 222 for an application element defined in namespace 904 can be associated with a device defined in namespace 902.

Automation objects 222 can also represent other elements of a control system or industrial environment, such as control loops, safety zones, lot traceability systems, or other such elements.

Some or all of these automation objects 222 can be defined by the logical model associated with the industrial DSL and can therefore be referenced via the DSL's hierarchical namespace. DSL editor 224 can also allow users to define custom automation objects 222 and incorporate these custom objects 222 into the editor's logical model (e.g., at specified locations within the namespace hierarchy).

A given automation object definition can define the inputs, logic (e.g., inline logic definitions or externally specified logic), outputs, and any of the properties or attributes described above in connection with FIG. 4. These properties and attributes may be specified inline or may be linked to the automation object via a scripted link to an external source (e.g. a support document for an industrial asset represented by the automation object). These object definitions can be written and called within the industrial DSL editor 224.

In addition to intrinsic data types such as integers, double integers, Boolean, floating point, etc., DSL editor 224 can also support definition of data types specific to industrial automation applications, including but not limited to screens (representing HMI screens), add-on graphics, automation objects, devices (e.g., automation devices such as controllers, drives, telemetry devices, etc.), projects, models, applications (e.g., applications that can be deployed to a device for execution, such as control logic, analytics applications, power monitoring applications, etc.), programs, parameter connections, tasks, tags (e.g., controller tags), or other such data types. The DSL editor 224 allows instances of these types to be created for inclusion in a system project 302. Instances of each type may have certain properties or members that are a function of the type.

The industrial DSL supported by the DSL editor 224 can provide programmatic guardrails based on known relationships between industrial entities represented by automation objects (e.g., controllers, tags, HMIs, motor drives, tanks, valves, etc.), and editor tools 804 can guide the project development workflow based on these known relationships. This can include, for example, identifying when a parent automation object 222 (e.g., a tank automation object) has been invoked within the DSL program and rendering possible child automation objects 222 (e.g., valves, pumps, etc.) associated with the parent object that the user may wish to reference.

DSL editor 224 allows a user to program any aspects of the system project 302 using a customizable industrial DSL script 802. The DSL editor's parser 812 can then parse this DSL script 802 to yield a hierarchical model (e.g., an abstract syntax tree or another model format) of the program. The DSL editor's compiler 810 can then translate this hierarchical model to industrial code 806 (including any automation objects 222 defined by the DSL script 802) that is understandable and executable by an industrial control device (e.g., a programmable logic controller or another type of industrial control device). The resulting industrial code 806 can then be added to system project 302 or deployed directly to the target control device. In general, the DSL editor 224 can map the industrial DSL to a structured language understandable by the target industrial control equipment.

Figure 10:
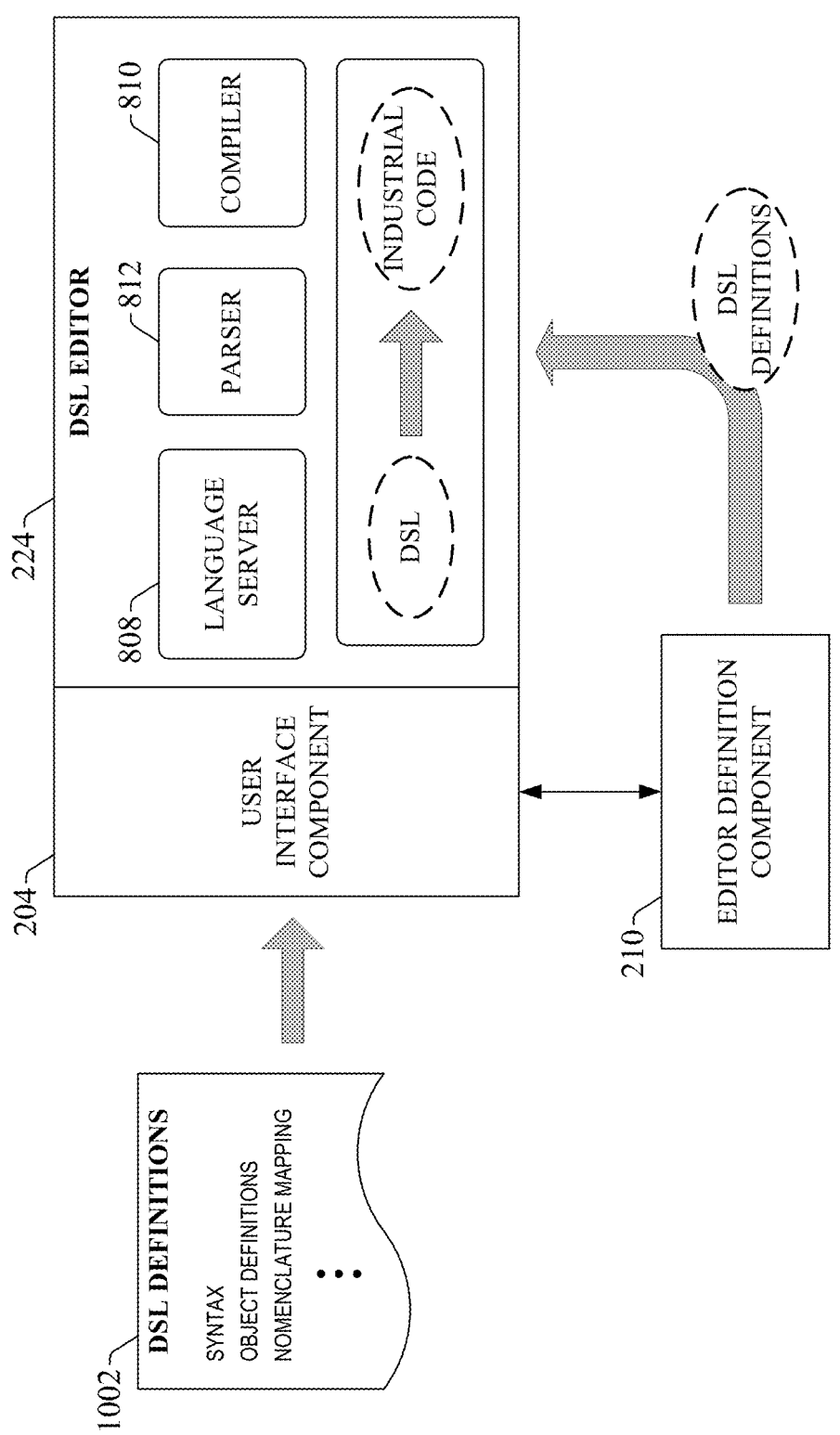
FIG. 10 is a diagram illustrating customization of the IDE system's programming interface.

In some embodiments, IDE system 202 can include application programming interfaces (APIs) that allow third parties—such as OEMs, system integrators, industrial asset owners, or other such users—to program their own development interfaces and customize their own DSLs for interacting with the IDE system's development platform and populating a system project 302. FIG. 10 is a diagram illustrating customization of the IDE system's programming interface according to one or more embodiments. In this example, the user interface component 204 and DSL editor 224 can be associated with an editor definition component 210 that can modify the DSL editor's programming interfaces based on DSL definitions 1002 submitted by a user. The editor definition component 210 allows the user to define or modify the syntax of the industrial DSL supported by the DSL editor 224, define objects (e.g., automation objects) to be included in the DSL's logical model as well as relationships between these objects, define one or more of the editor tools 804 for guiding the developer through the programming workflow, or define other such features of the programming interface. Editor definition component 210 can update the DSL editor 224 based on these DSL definitions 1002 to thereby customize the IDE's development interface in accordance with user requirements or preferences. In this way, the industrial DSL can be used to extend the IDE platform to third-party users, allowing users to define their own language script that can be translated and compiled into industrial code 806 that can be executed on industrial equipment. By allowing users to define the syntax and editor tools 804 (error highlights, syntax highlighting, automated recommendation, guardrails, etc.), the look and feel of the DSL editor's interface for generating industrial control code can be customized by end users.

Figure 11:
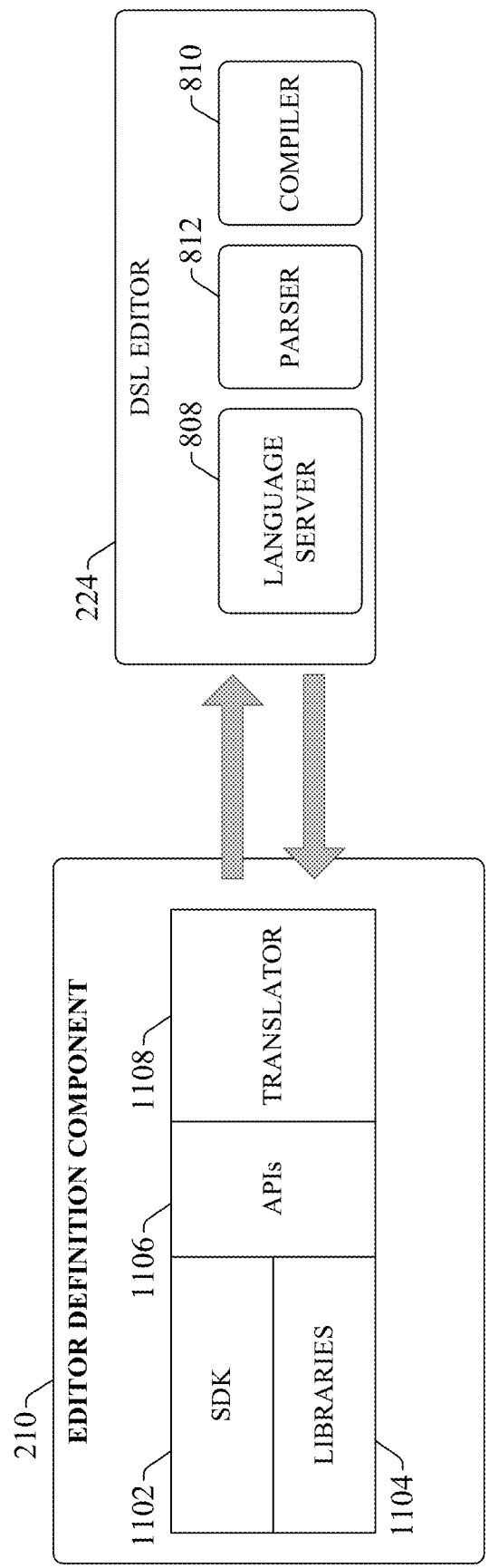
FIG. 11 is a block diagram illustrating components of an example editor definition component.

FIG. 11 is a block diagram illustrating components of an example editor definition component 210 according to one or more embodiments. In an example implementation, a software development kit (SDK) 1102 and/or associated libraries 1104 can be licensed that allows users (e.g., OEMs or system integrators) to build their own DSL editor 224, build extensions, access the logical model, and add to system projects 302. The APIs 1106 can allow users to create their own language script as a customized industrial DSL, which can then be parsed and compiled (e.g., by parser 812 and compiler 810 of the DSL editor 224) to executable control code that is understandable and executable by industrial control devices. A translator 1108 between the APIs 1106 and the IDE development platform can expose the system project 302 and allow users to write their own control code and customize the DSL editor 224.

In some embodiments, the IDE system 202 can also allow a user to install a plug-in for a known programming language—such as Python, C, structured text, etc.—and allow the user to develop industrial code in this language. In such scenarios, the plug-in can map the selected programming language to control code understandable and executable by industrial controllers, HMIs, or other industrial devices. In this way, the DSL editor 224 allows the user to develop industrial control code in a preferred programming language, and can compile the customer's code into a form that the IDE system 202—and an industrial control device—can understand.

In some embodiments, IDE system 202 can support industrial programming languages such as ladder logic, and editor definition component 210 can allow users to customize the ladder logic development environment according to their preferences. This can include altering the native nomenclature of the ladder logic editor to preferred nomenclature preferred by the user. For example, DSL definitions 1002 submitted by the user can include nomenclature mapping definitions that map the ladder logic editor's native nomenclature to preferred nomenclature specified by the user. In an example scenario, the function for moving a data value from a source register to a destination register may be referred to as a MOV command in the editor's native nomenclature. To add this functionality to a control program, users must select and add a MOV function block to a rung output of their ladder logic program. Since the name of this function block may be considered ambiguous to some programmers, a user may wish to change the name of this function block to MOVE to more explicitly convey the function associated with this command. Accordingly, the editor definition component 210 can allow the user to change the name of this command from MOV to MOVE by submitting DSL definitions 1002 that define this nomenclature mapping. Once this mapping has been defined, all instances of the MOV command will be labeled MOVE within the ladder logic editing environment. Other aspects of the ladder logic editor, including but not limited to text or rung colors, function block dimensions or sizes, locations and visibility of toolbars, or other such features can also be customized in this manner.

Figure 12:
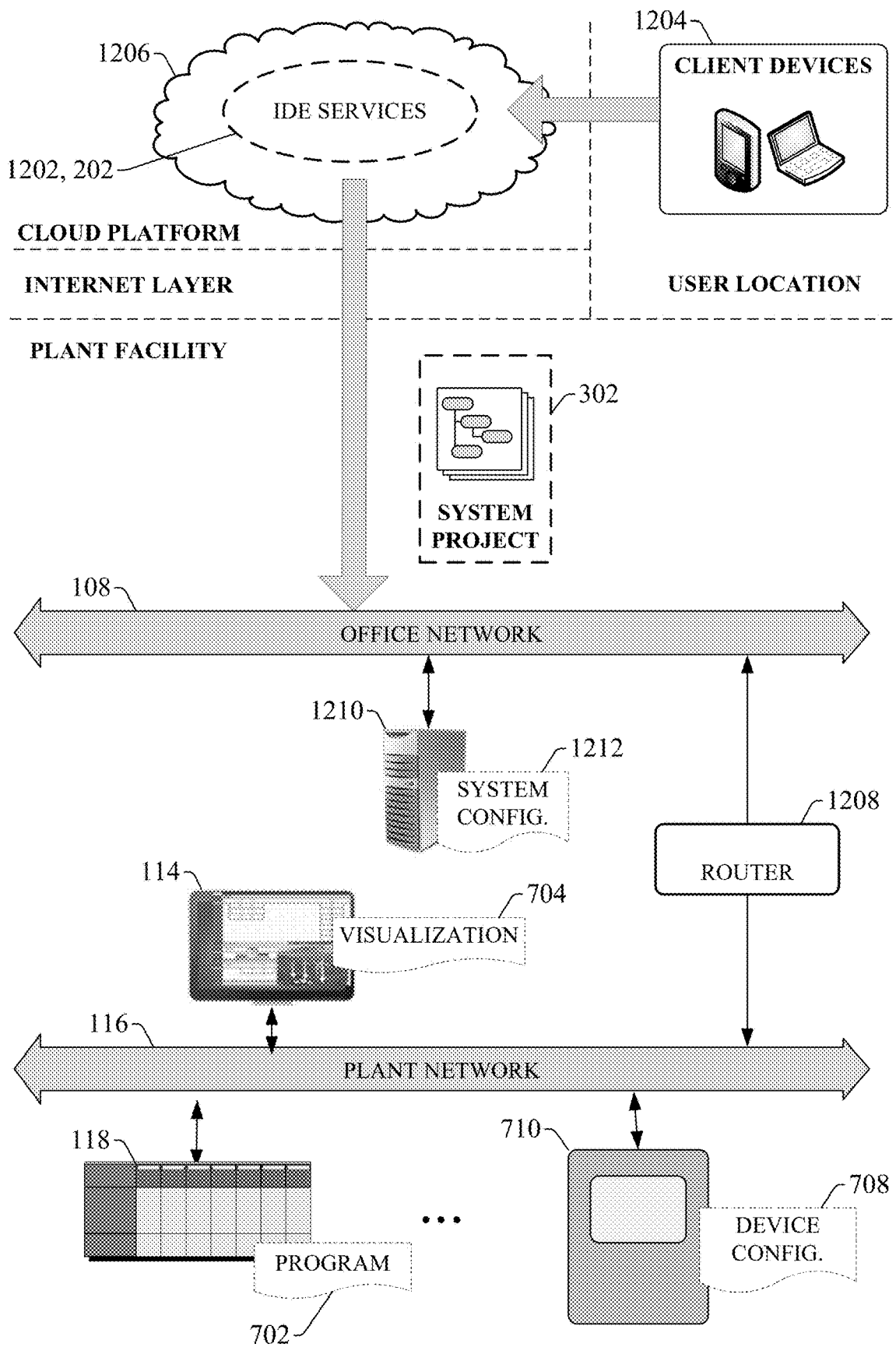
FIG. 12 is a diagram illustrating an example architecture in which cloud-based IDE services are used to develop and deploy industrial applications to a plant environment.

As noted above, some embodiments of IDE system 202 can be embodied on a cloud platform. FIG. 12 is a diagram illustrating an example architecture in which cloud-based IDE services 1202 are used to develop and deploy industrial applications to a plant environment. In this example, the industrial environment includes one or more industrial controllers 118, HMI terminals 114, motor drives 710, servers 1201 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 1210 reside on a separate office network 108 that is connected to the plant network 116 (e.g., through a router 1208 or other network infrastructure device).

In this example, IDE system 202 resides on a cloud platform 1206 and executes as a set of cloud-based IDE service 1202 that are accessible to authorized remote client devices 1204. Cloud platform 1206 can be any infrastructure that allows shared computing services (such as IDE services 1202) to be accessed and utilized by cloud-capable devices. Cloud platform 1206 can be a public cloud accessible via the Internet by devices 1204 having Internet connectivity and appropriate authorizations to utilize the IDE services 1202. In some scenarios, cloud platform 1206 can be provided by a cloud provider as a platform-as-a-service (PaaS), and the IDE services 1202 can reside and execute on the cloud platform 1206 as a cloud-based service. In some such configurations, access to the cloud platform 1206 and associated IDE services 1202 can be provided to customers as a subscription service by an owner of the IDE services 1202. Alternatively, cloud platform 1206 can be a private cloud operated internally by the industrial enterprise (the owner of the plant facility). An example private cloud platform can comprise a set of servers hosting the IDE services 1202 and residing on a corporate network protected by a firewall.

Cloud-based implementations of IDE system 202 can facilitate collaborative development by multiple remote developers who are authorized to access the IDE services 1202. When a system project 302 is ready for deployment, the project 302 can be commissioned to the plant facility via a secure connection between the office network 108 or the plant network 116 and the cloud platform 1206. As discussed above, the industrial IDE services 1202 can translate system project 302 to appropriate executable files—control program files 702, visualization applications 704, device configuration files 708, system configuration files 1212—and deploy these files to the appropriate devices in the plant facility to facilitate implementation of the automation project.

Although features of the industrial DSL have been described herein in the context of IDE systems 202 having features discussed in connection with FIGS. 3-7, it is to be appreciated that the DSL editor 224 and associated editor definition component 210 described herein can be components of other types of IDEs that omit some or all of the features described in connection with FIGS. 3-7. That is, any IDE for development of industrial control code that supports the use of industrial DSLs, and customization thereof, is within the scope of one or more embodiments of this disclosure.

The industrial DSL and associated DSL editor and editor definition component render development of industrial control code more efficient relative to ladder logic platforms or other industrial development platforms, allowing programmers to generate industrial control code using a script-based DSL requiring fewer mouse clicks relative to traditional control programming environments. Dynamic feedback provided by the IDE's editing tools associated can guide the developer through the process of developing control code that is in compliance with industry or in-house standards.

Figure 13:
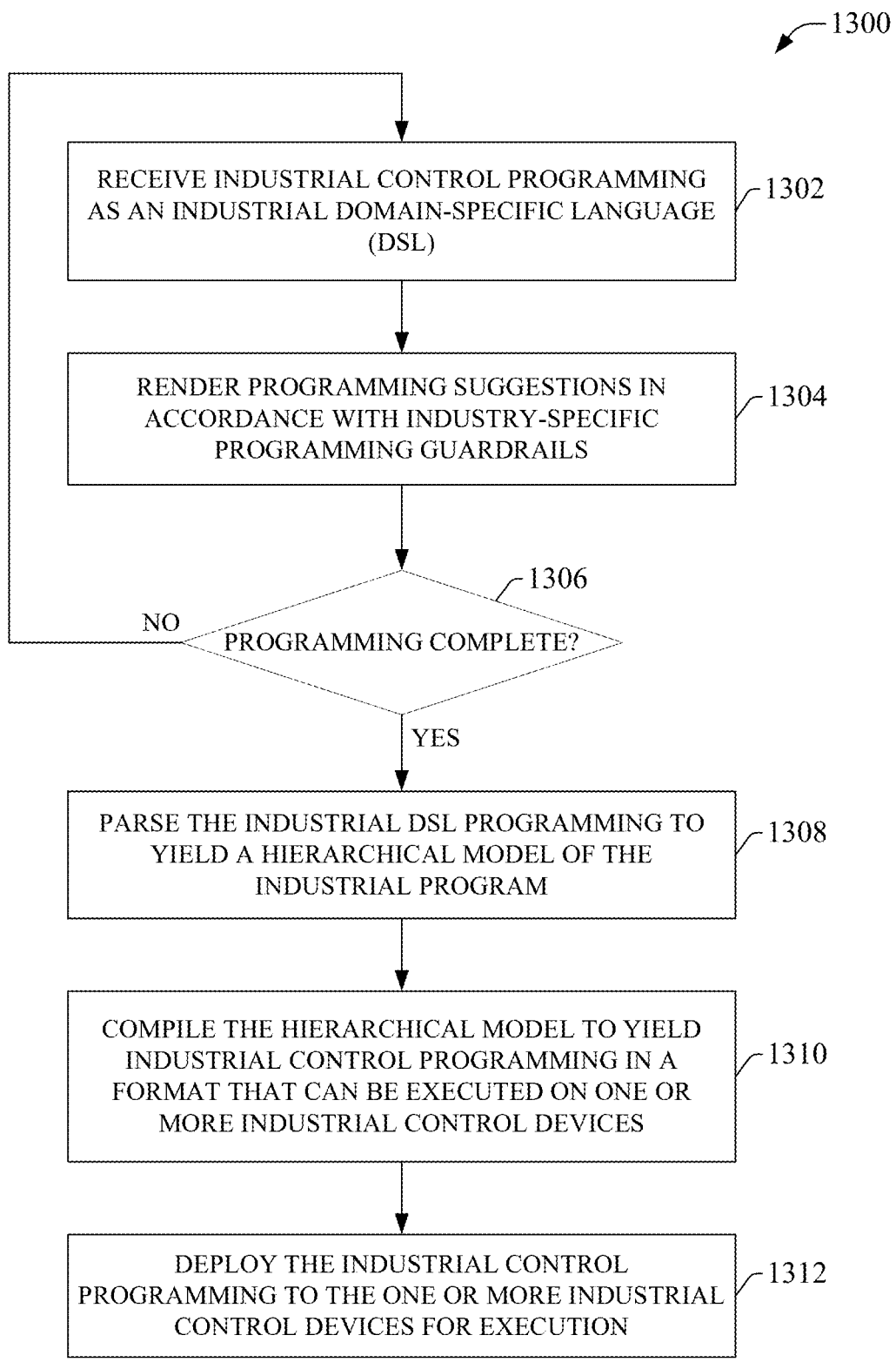
FIG. 13 is a flowchart of an example methodology for developing industrial control programming.
Figure 14:
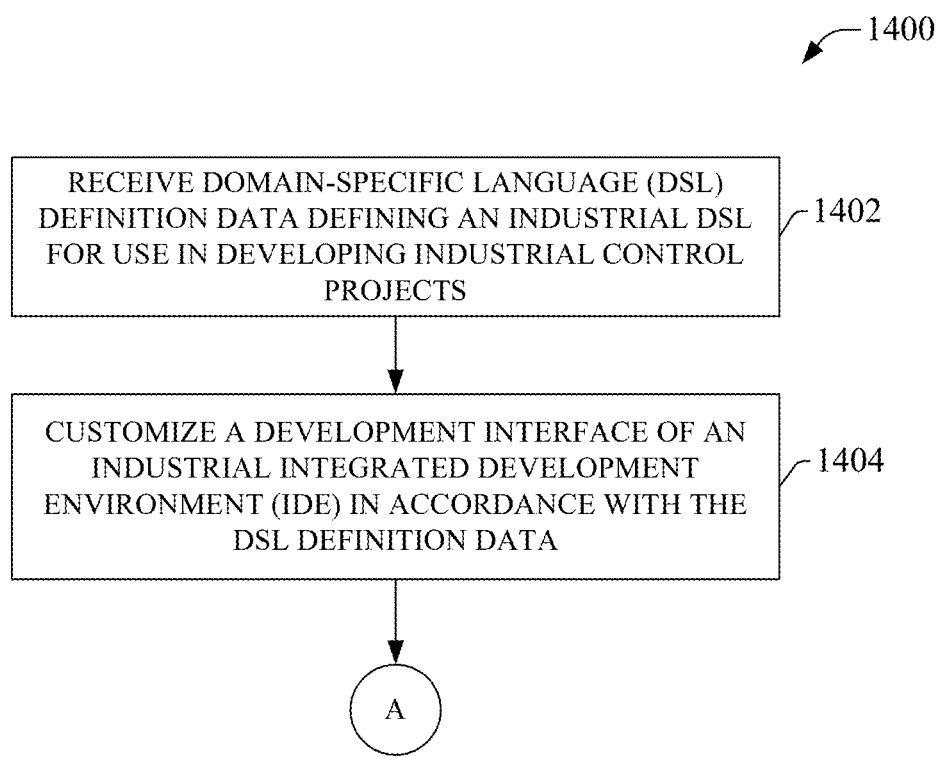
FIG. 14 is a flowchart of an example methodology for customizing a programming interface of an industrial IDE.

FIGS. 13-14 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for developing industrial control programming. In some embodiments methodology 1300 can be implemented on an industrial IDE that provides a development platform for designing and programming industrial control projects. Initially, at 1302, industrial control programming is received as an industrial domain-specific language (DSL). The industrial DSL can be, for example, a scripted language that supports creation of automation objects representing industrial processes, assets, devices, machines, etc., and having relationships defined by an automation object namespace hierarchy. At 1304, programing suggestions are rendered in accordance with industry-specific guardrails as the industrial control programming is received. Example suggestions can include, for example, suggested automation objects to be added to the project based on an inference of the programmer's intentions (e.g., recommending addition of a pump automation object at an appropriate location in the program if the developer is scripting a flow control application), auto-completing sections of code by adding predefined vertical-specific or application-specific code modules for common control operations, enforcing preferred in-house or industry-standard coding practices via error highlighting or syntax highlighting, or other such suggestions.

At 1306, a determination is made as to whether programming is complete. This determination may be made, for example, in response to an indication from the programmer that the industrial DSL program is ready to be parsed and compiled. If the programming is not complete (NO at step 1306) the methodology returns to step 1302. Steps 1302 and 1304 are repeated until programming is complete (YES at step 1306), at which time the methodology proceeds to step 1308.

At 1308, the industrial DSL programming received at step 1302 is parsed to yield a hierarchical model of the industrial program. At 1310, the hierarchical model obtained at step 1308 is compiled to yield industrial control programming having a format that can be executed on one or more industrial control devices. At 1312, the industrial control programming obtained at step 1310 is deployed to the one or more industrial control devices for execution of the control project.

FIG. 14 illustrates an example methodology 1400 for customizing a programming interface of an industrial IDE. At 1402, DSL definition data defining an industrial DSL for use in developing industrial control projects is received. The DSL definition data can specify, for example, a syntax of the industrial DSL, definitions of automation objects that can be called within the industrial DSL (e.g., automation objects representing industrial assets such as machines, processes, controllers, drives, control programs, controller tags, etc.), parent-child relationships between the automation objects, namespaces, mapping of programming nomenclature, programming guardrails, code modules for frequently programmed control tasks or applications (e.g., pumping applications, conveyor control applications, web tension control applications, etc.), or other such aspects of the industrial DSL. At 1404, the development interface of the industrial IDE is customized in accordance with the DSL definition data received at step 1402. The methodology can then proceed to methodology 1300 described above in connection with FIG. 13, with steps 1302 and 1304 carried out in accordance with the customized industrial DSL defined by methodology 1400. That is, the industrial DSL received at step 1302 and programming suggestions rendered at step 1304 can be defined at least in part by the DSL definition data received at step 1402.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 15:
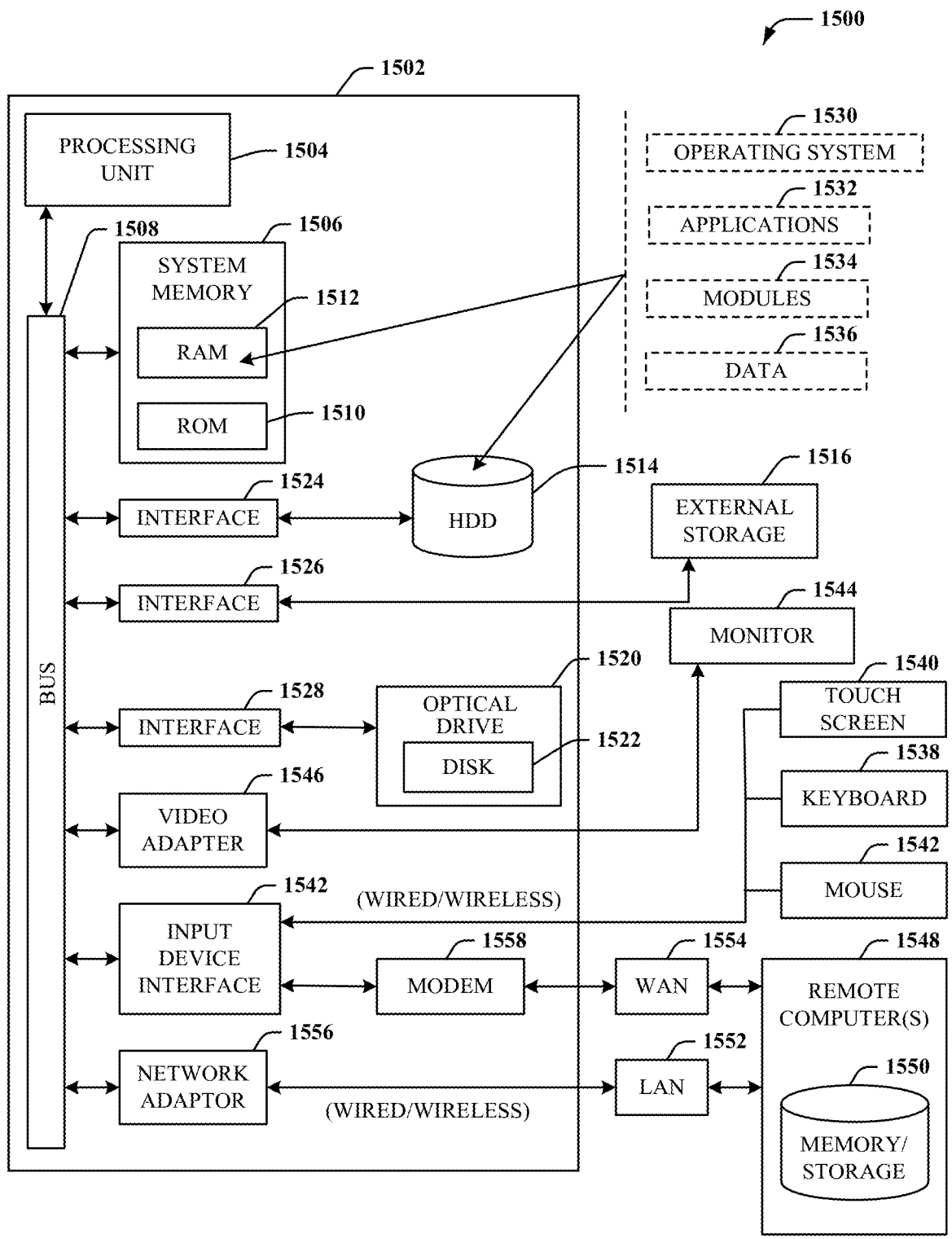
FIG. 15 is an example computing environment.
Figure 16:
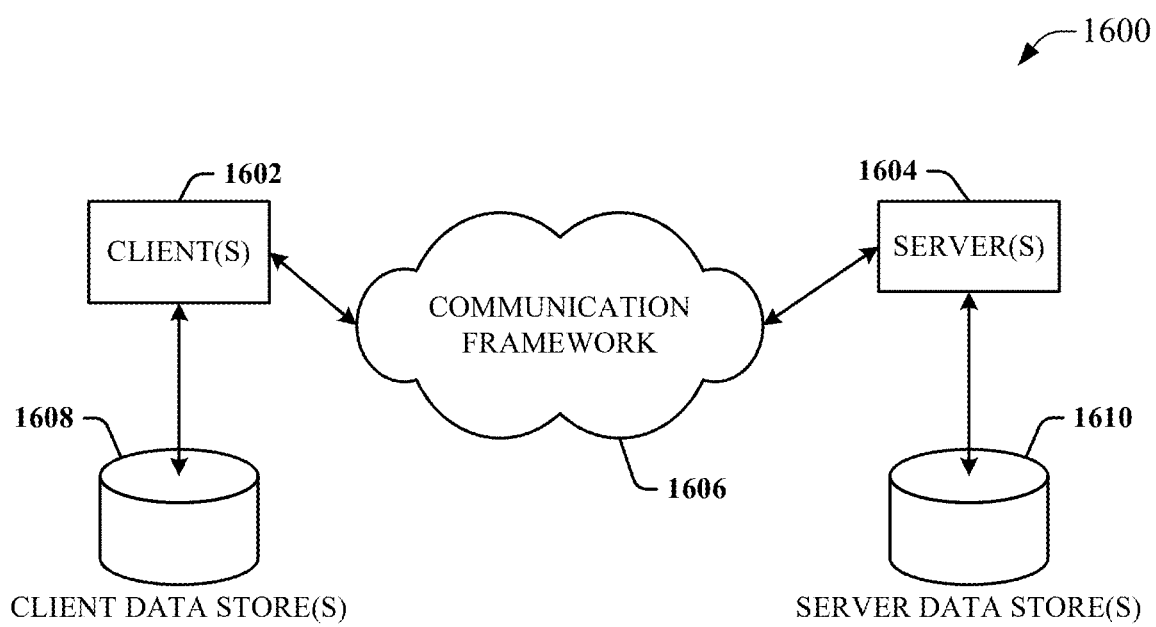
FIG. 16 is an example networking environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for application programs 1532. Runtime environments are consistent execution environments that allow application programs 1532 to run on any operating system that includes the runtime environment. Similarly, operating system 1530 can support containers, and application programs 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless access point (AP) disposed thereon for communicating with the adapter 1556 in a wireless mode.

When used in a WAN networking environment, the computer 1502 can include a modem 1558 or can be connected to a communications server on the WAN 1554 via other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1552 or WAN 1554 e.g., by the adapter 1556 or modem 1558, respectively. Upon connecting the computer 1502 to an associated cloud storage system, the external storage interface 1526 can, with the aid of the adapter 1556 and/or modem 1558, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 16 is a schematic block diagram of a sample computing environment 1600 with which the disclosed subject matter can interact. The sample computing environment 1600 includes one or more client(s) 1602. The client(s) 1602 can be hardware and/or software (e.g., threads, processes, computing devices). The sample computing environment 1600 also includes one or more server(s) 1604. The server(s) 1604 can also be hardware and/or software (e.g., threads, processes, computing devices). The servers 1604 can house threads to perform transformations by employing one or more embodiments as described herein, for example. One possible communication between a client 1602 and servers 1604 can be in the form of a data packet adapted to be transmitted between two or more computer processes. The sample computing environment 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial control programming, comprising:
    a memory that stores executable components; and
    a processor, operatively coupled to the memory, that executes the executable components, the executable components comprising:
        a user interface component configured to receive industrial control programming formatted as an industrial domain-specific language (DSL) and to render programming feedback in response to receipt of the industrial control programming, wherein the user interface component generates the programming feedback based on industry-specific guardrail definitions, and the programming feedback comprises at least one of a programming recommendation, an auto-completion, an error highlight, or a syntax highlight that facilitates compliance of the industrial control programming with an industry-specific standard defined by the industry-specific guardrail definitions; and
        a DSL editor configured to compile the industrial control programming to yield industrial control code that is executable on an industrial control device.

2. The system of claim 1, wherein the programming feedback further comprises at least one of code snippet management feedback, a type-ahead recommendation, or a programming suggestion.

3. The system of claim 1, further comprising an editor definition component configured to receive DSL definition input that defines programming features of the industrial DSL and to configure the DSL editor to support the programming features based on the DSL definition input.

4. The system of claim 3, wherein the DSL definition input defines at least one of a syntax of the industrial DSL, automation objects supported by the industrial DSL, parent-child relationships between the automation objects, a namespace supported by the industrial DSL, or types of the programming feedback rendered by the user interface component.

5. The system of claim 1, wherein the DSL editor supports instantiation of automation objects within the industrial control programming, the automation objects representing industrial assets including at least one of an industrial process, a controller, a control program, a tag within the control program, a machine, a motor, a motor drive, a telemetry device, a tank, a valve, a pump, an industrial safety device, an industrial robot, or an actuator.

6. The system of claim 5, wherein the DSL editor organizes the automation objects in terms of a plant hierarchy.

7. The system of claim 5, wherein an automation object, of the automation objects, has associated therewith at least one of an input, an output, an analytic routine, an alarm, a security feature, or a graphical representation of an associated industrial asset.

8. The system of claim 1, wherein
    the DSL editor is configured to select, from a library of pre-defined code modules, a code module determined to be relevant to a current programming task, and
    the programming feedback further comprises a recommendation to add the code module to the industrial control programming based on an inference of the current programming task.

9. The system of claim 1, wherein the industry-specific standard defined by the industry-specific guardrail definitions is a standard specific to at least one of an automotive industry, a pharmaceutical industry, an oil and gas industry, a food and drug industry, or a marine industry.

10. A method for programming industrial systems, comprising:
    receiving, by a system comprising a processor, industrial control programming input scripted as an industrial domain-specific language (DSL);
    rendering, by the system based on industry-specific guardrail definitions, programming feedback in response to receipt of the industrial control programming input, wherein the programming feedback comprises at least one of a programming recommendation, an auto-completion, an error highlight, or a syntax highlight that facilitates compliance of the industrial control programming with an industry-specific standard defined by the industry-specific guardrail definitions; and
    compiling, by the system, the industrial control programming input to yield industrial control code that is executable on an industrial control device.

11. The method of claim 10, wherein the programming feedback further comprises at least one of code snippet management feedback, a type-ahead recommendation, or a programming suggestion.

12. The method of claim 10, further comprising:
    receiving, by the system, DSL definition input that defines programming features of the industrial DSL; and
    configuring, by the system in response to receiving the DSL definition input, the DSL editor to support the programming features defined by the DSL definition input.

13. The method of claim 12, wherein the programming features defined by the DSL definition input comprise at least one of a syntax of the industrial DSL, definitions of automation objects supported by the industrial DSL, parent-child relationships between the automation objects, a namespace supported by the industrial DSL, or types of the programming feedback rendered by the system.

14. The method of claim 10, wherein
receiving the industrial control programming input comprises receiving a programming command to instantiate one or more automation objects within the industrial control programming,
method further comprises instantiating the one or more automation objects in response to receiving the programming command, and
one or more automation objects representing respective industrial assets including at least one of an industrial process, a controller, a control program, a tag within the control program, a machine, a motor, a motor drive, a telemetry device, a tank, a valve, a pump, an industrial safety device, an industrial robot, or an actuator.

15. The method of claim 10, further comprising:
selecting, by the system from a library of pre-defined code modules, a code module determined to be relevant to a current programming task; and
rendering, as the programming feedback, a recommendation to add the code module to the industrial control programming based on an inference of the current programming task.

16. The method of claim 10, wherein the industry-specific standard defined by the industry-specific guardrail definitions is a standard specific to at least one of an automotive industry, a pharmaceutical industry, an oil and gas industry, a food and drug industry, or a marine industry.

17. A non-transitory computer-readable medium having stored thereon instructions that, in response to execution, cause a system comprising a processor to perform operations, the operations comprising:
receiving industrial control program input scripted as an industrial domain-specific language (DSL);
rendering, based on industry-specific guardrail definitions, programming feedback in response to receipt of the industrial control program input, wherein the programming feedback comprises at least one of a programming recommendation, an auto-completion, an error highlight, or a syntax highlight that facilitates compliance of the industrial control programming with an industry-specific standard defined by the industry-specific guardrail definitions; and
compiling the industrial control program input into industrial control code that is executable on an industrial control device.

18. The non-transitory computer-readable medium of claim 17, wherein the operations further comprise:
receiving DSL definition input that defines programming features of the industrial DSL; and
in response to receiving the DSL definition input, configuring the DSL editor to support the programming features defined by the DSL definition input.

19. The non-transitory computer-readable medium of claim 17, wherein the programming features defined by the DSL definition input comprise at least one of a syntax of the industrial DSL, definitions of automation objects supported by the industrial DSL, parent-child relationships between the automation objects, a namespace supported by the industrial DSL, or types of the programming feedback rendered by the user interface component.

20. The non-transitory computer-readable medium of claim 17, wherein the industry-specific standard defined by the industry-specific guardrail definitions is a standard specific to at least one of an automotive industry, a pharmaceutical industry, an oil and gas industry, a food and drug industry, or a marine industry.

* * * * *